March 10, 1936. L. W. SIMMS ET AL 2,033,258
BRUSH MAKING MACHINE
Filed Oct. 27, 1932 22 Sheets-Sheet 3
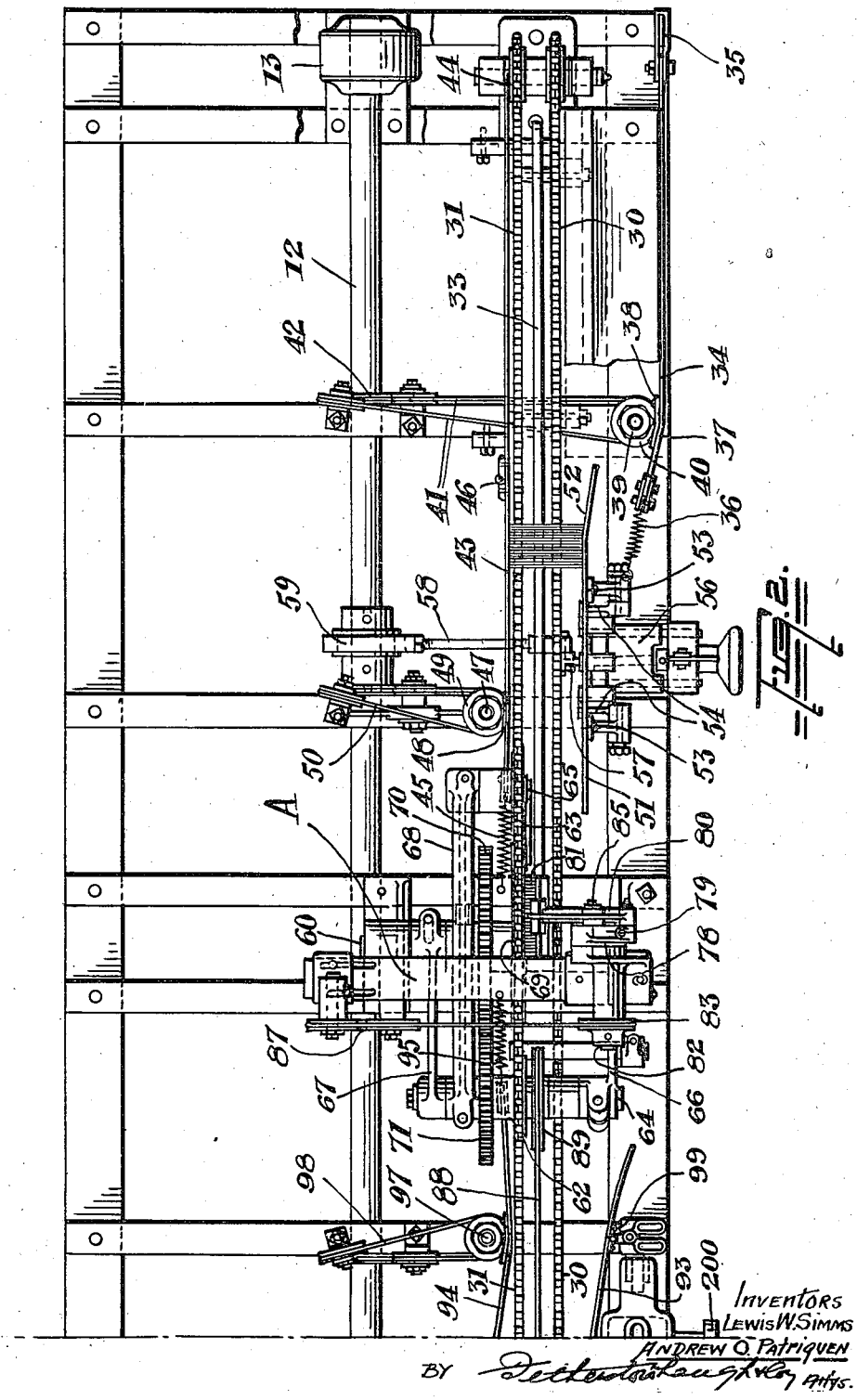

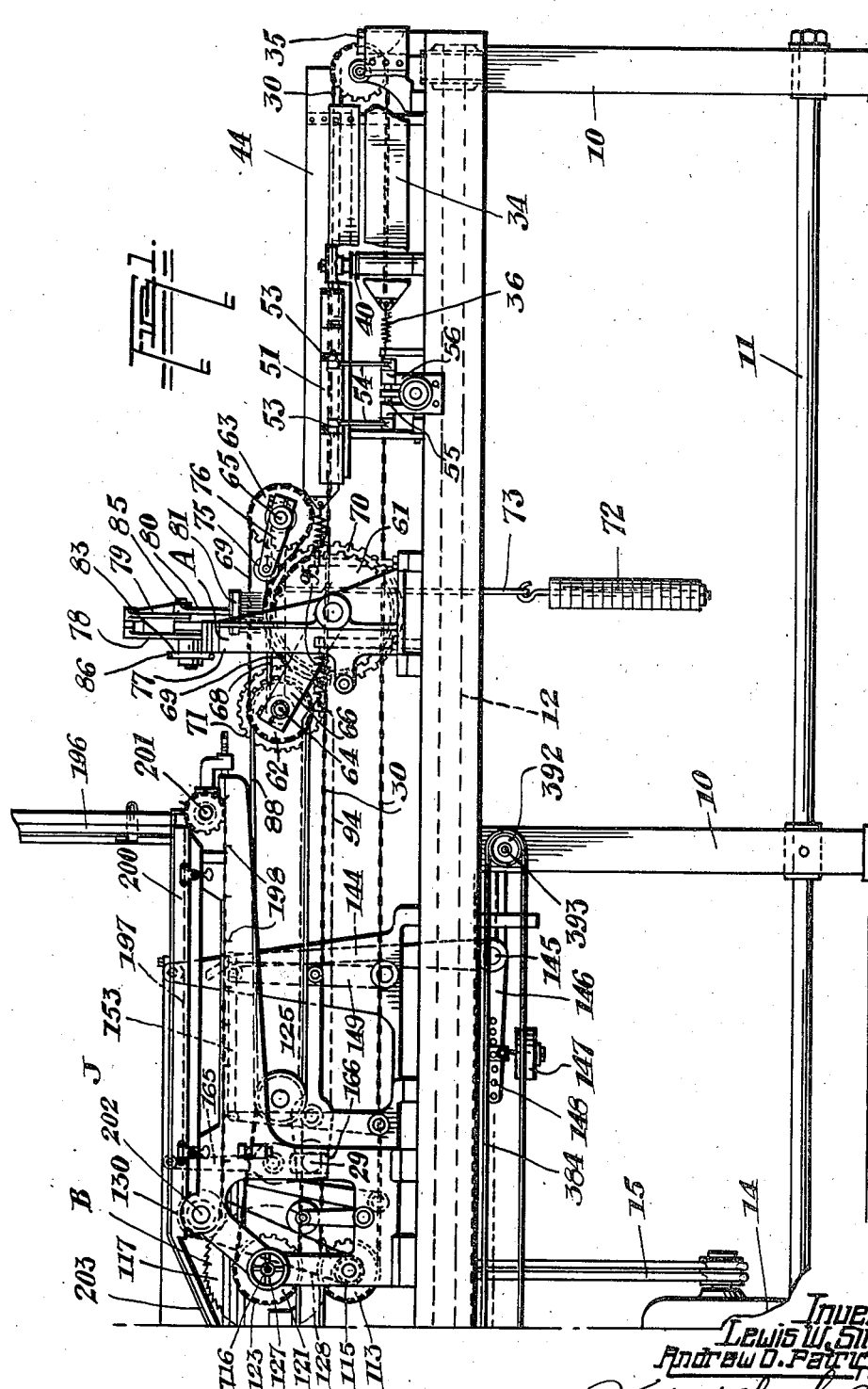

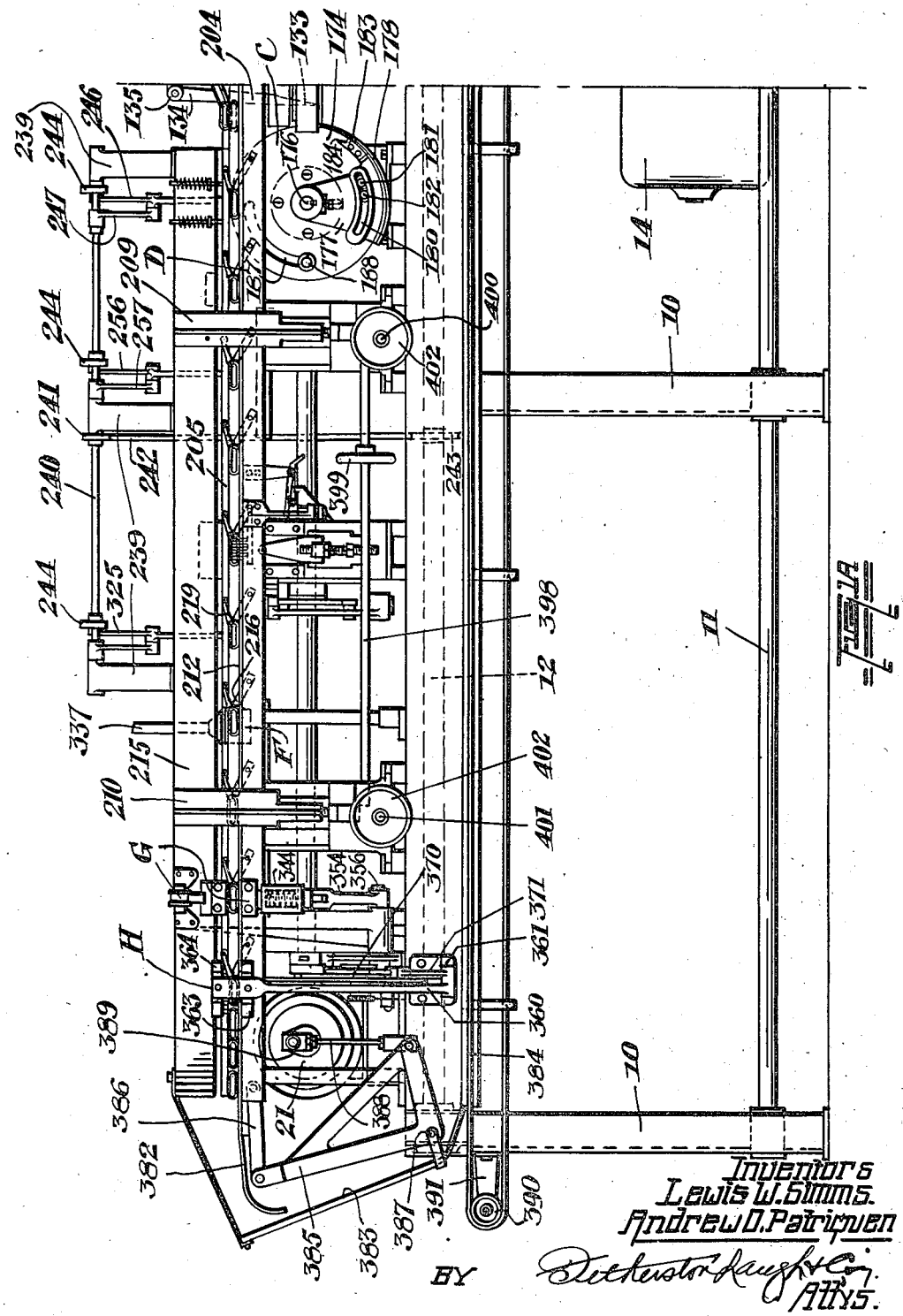

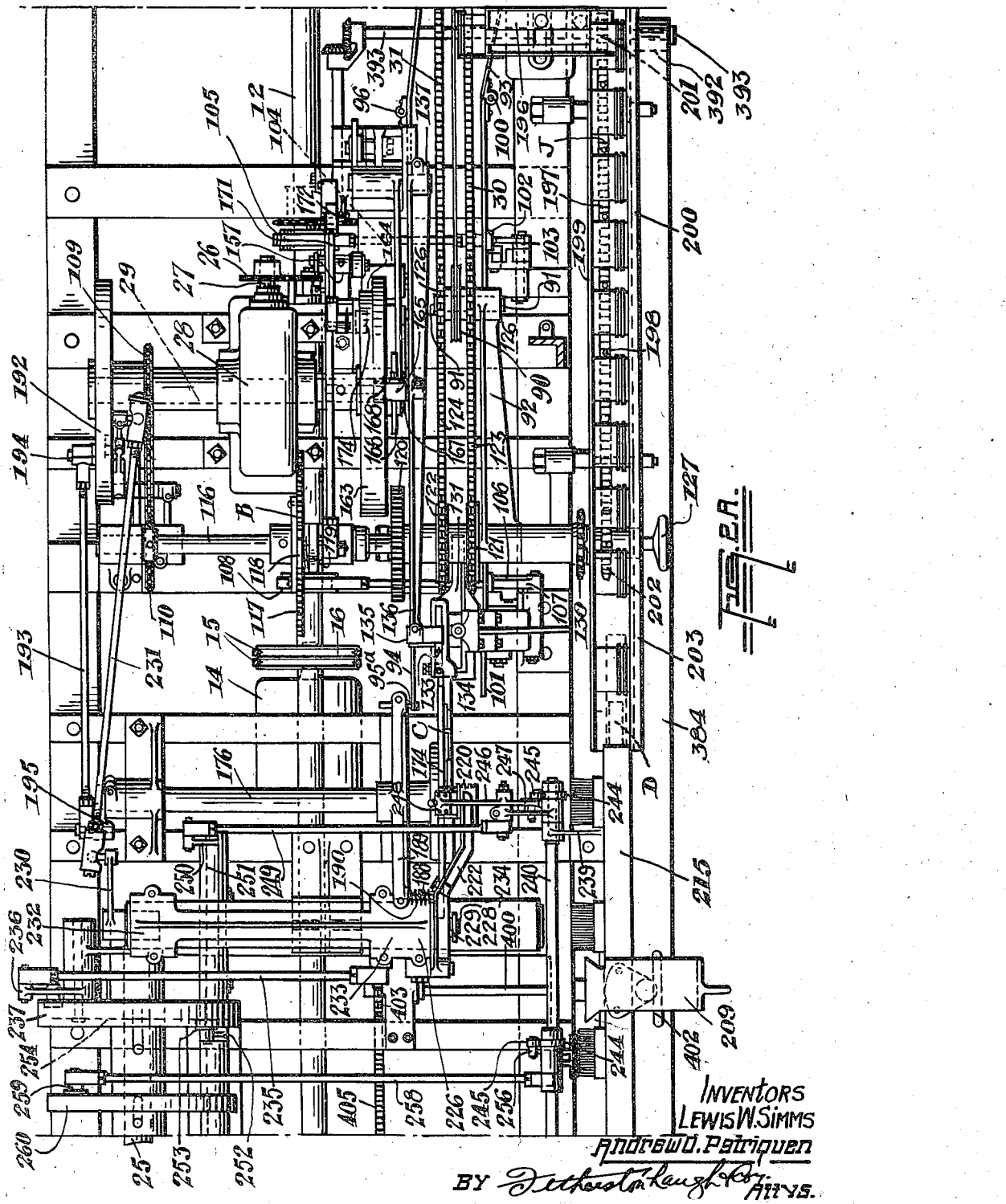

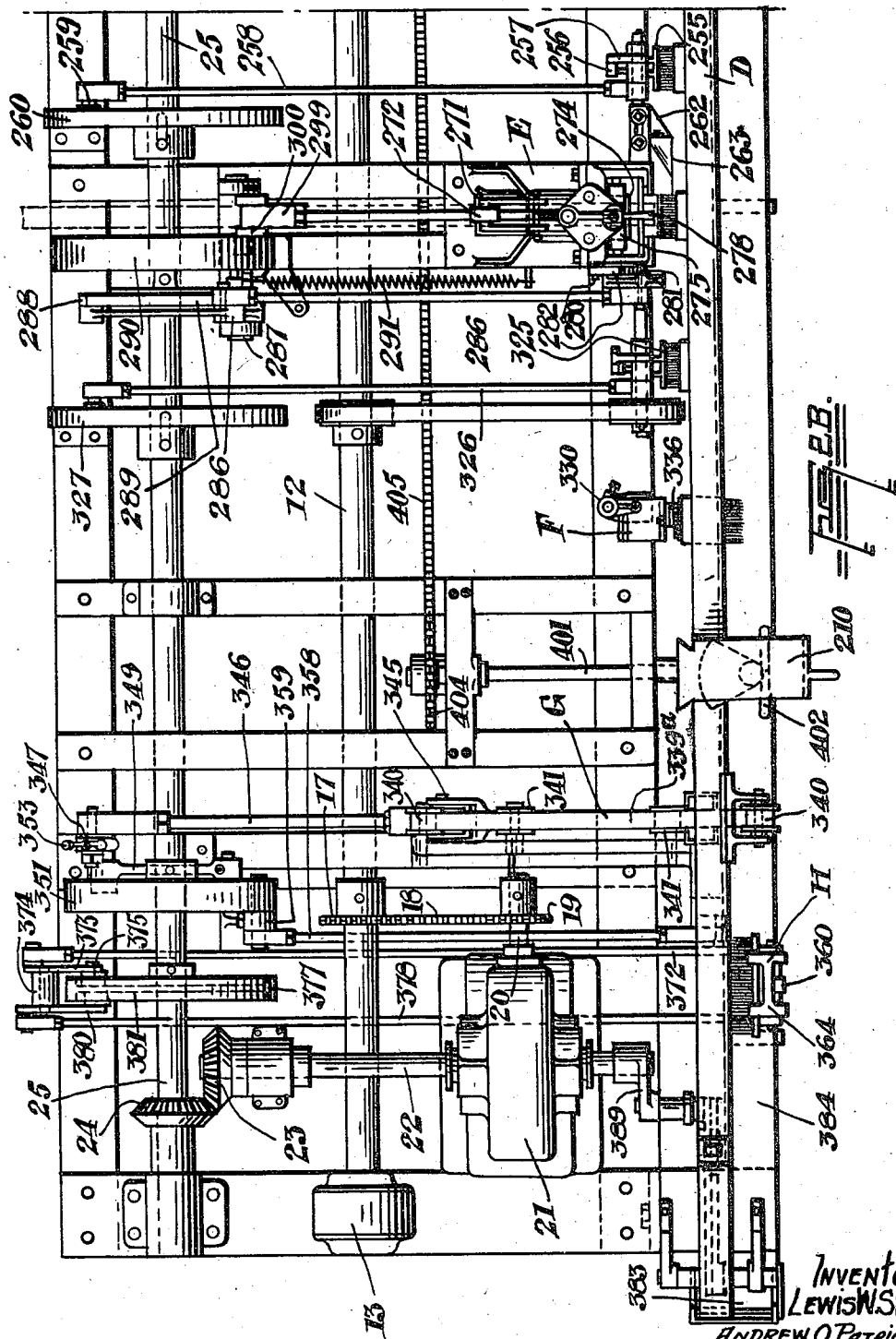

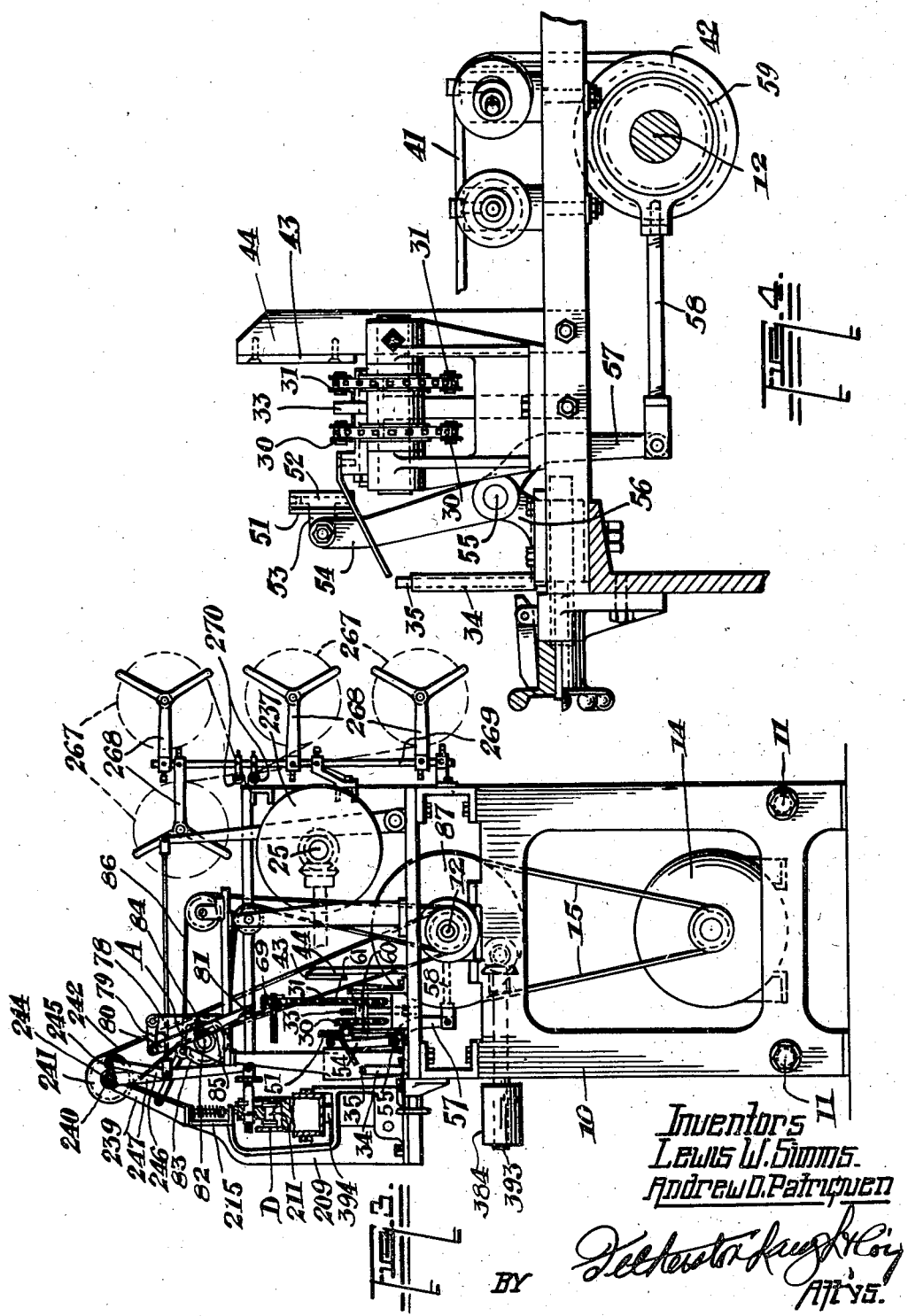

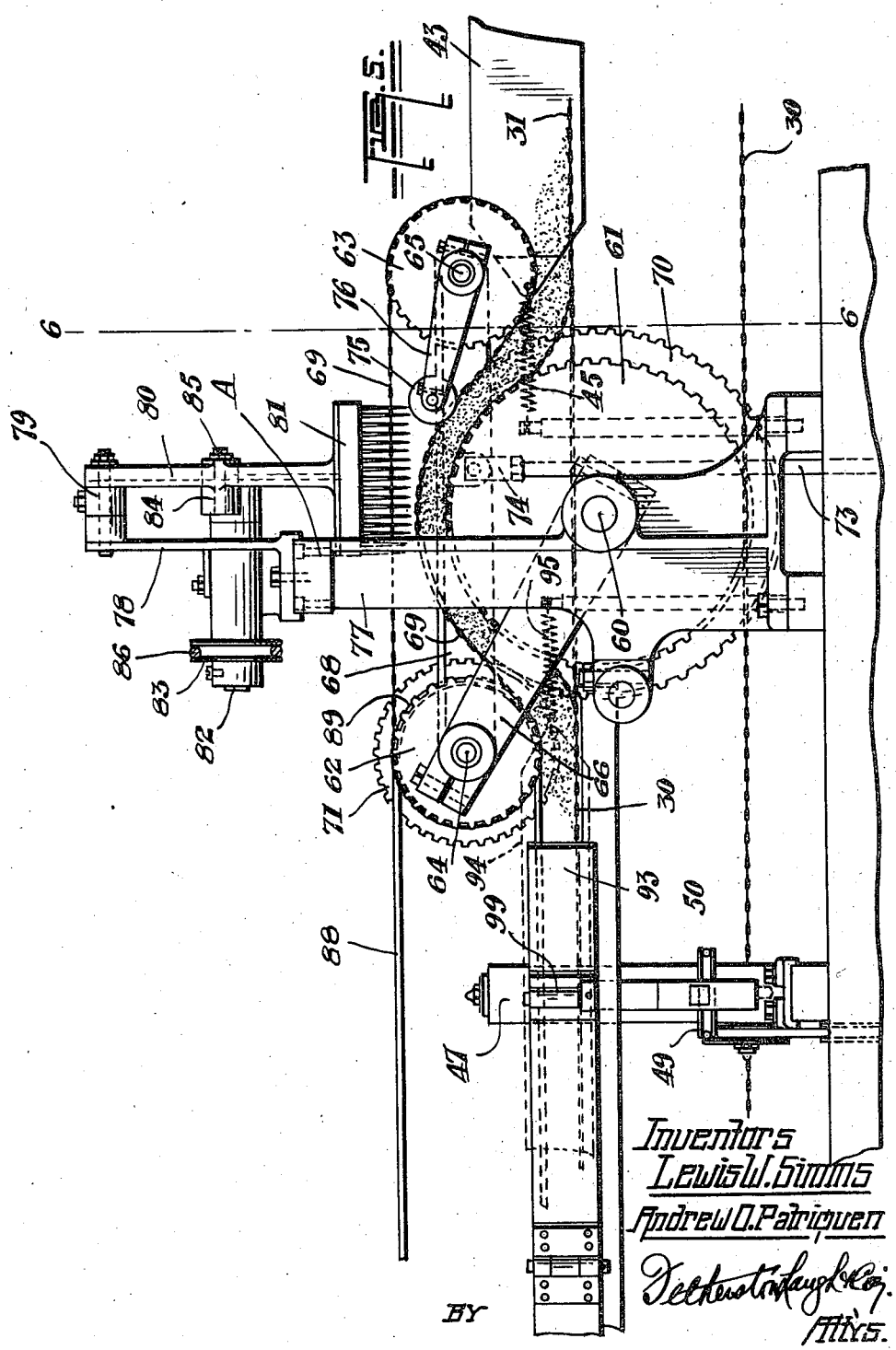

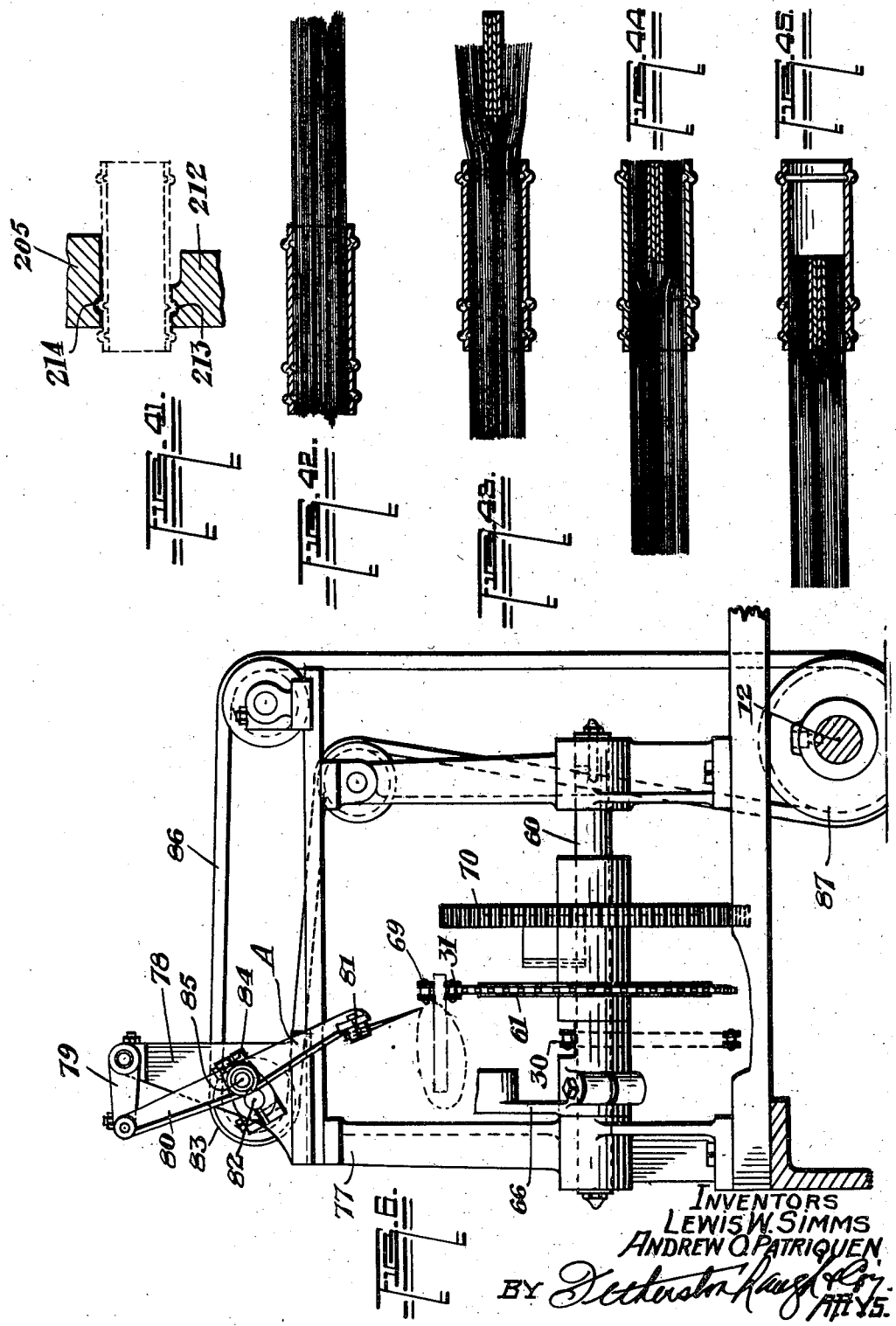

March 10, 1936. L. W. SIMMS ET AL 2,033,258
BRUSH MAKING MACHINE
Filed Oct. 27, 1932 22 Sheets-Sheet 9
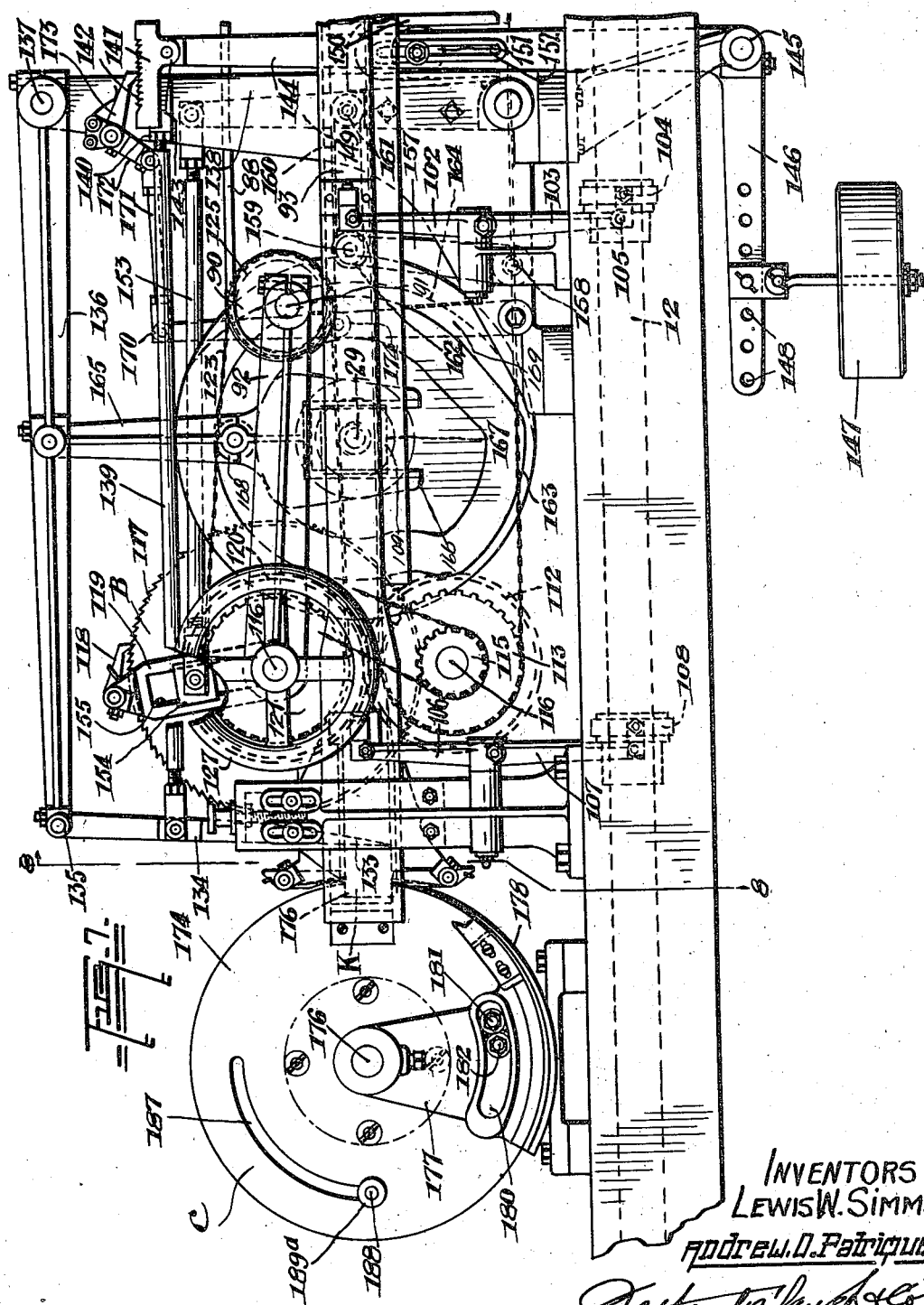
INVENTORS
Lewis W. Simms
Andrew D. Patriquen
BY
ATTYS

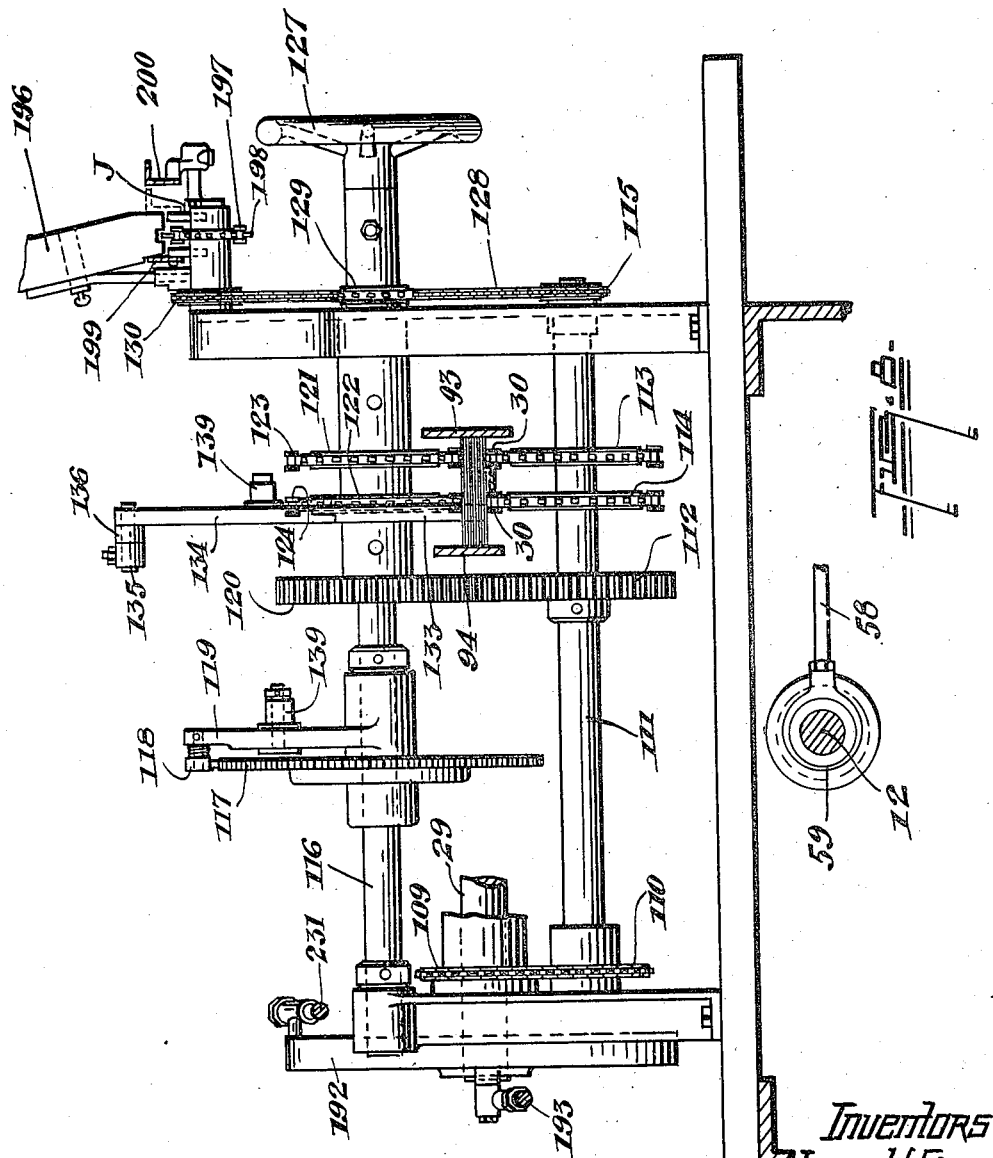

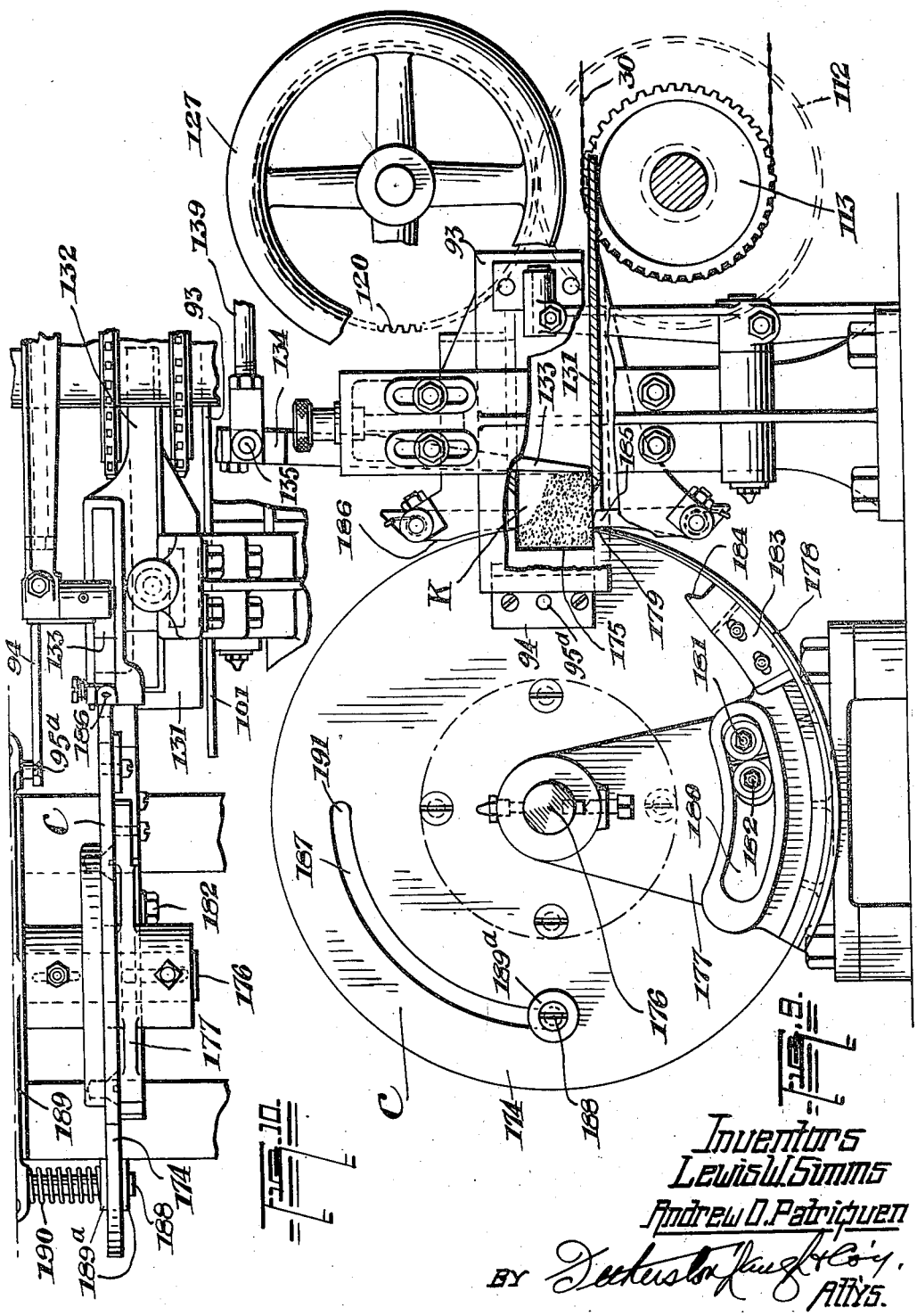

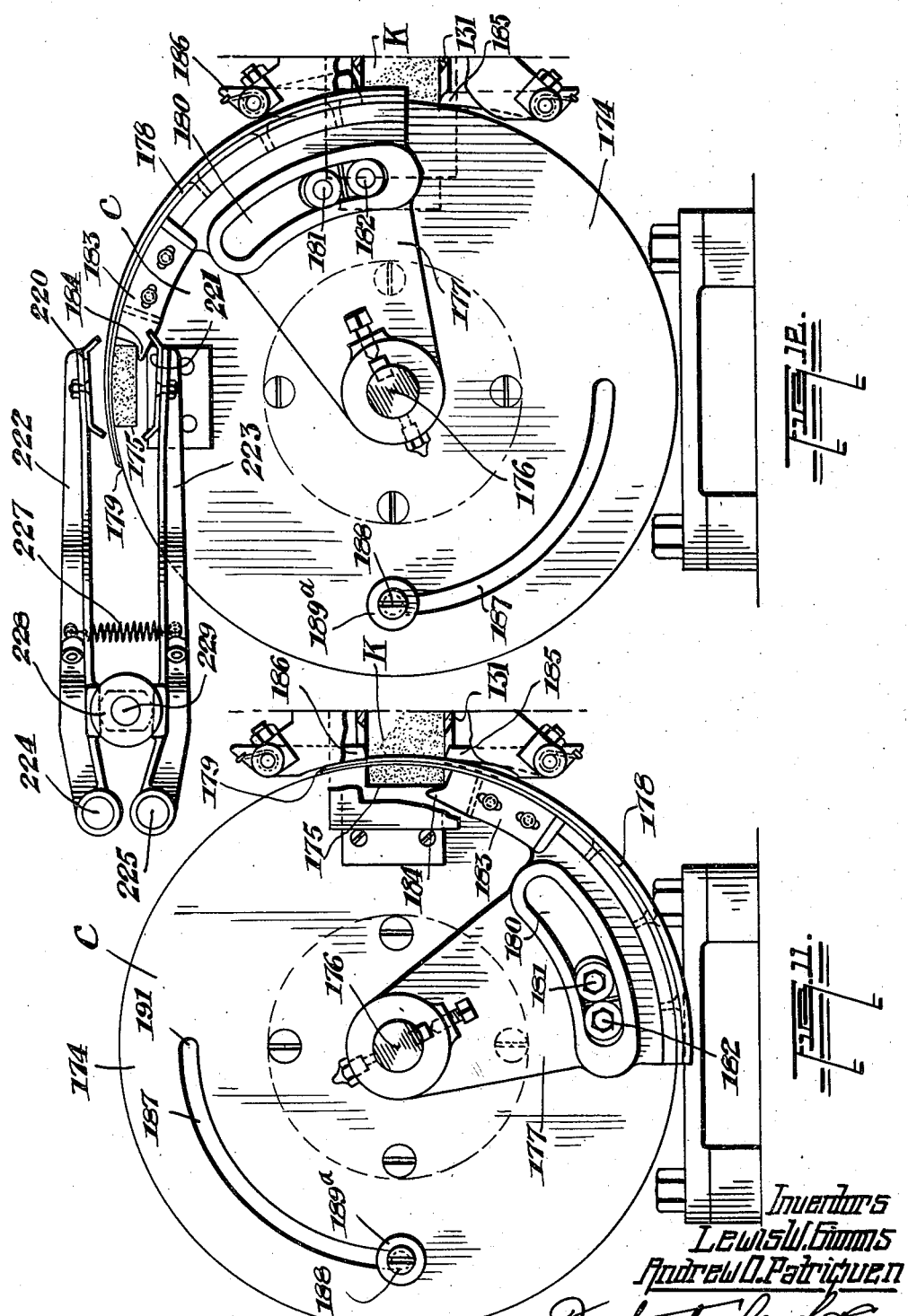

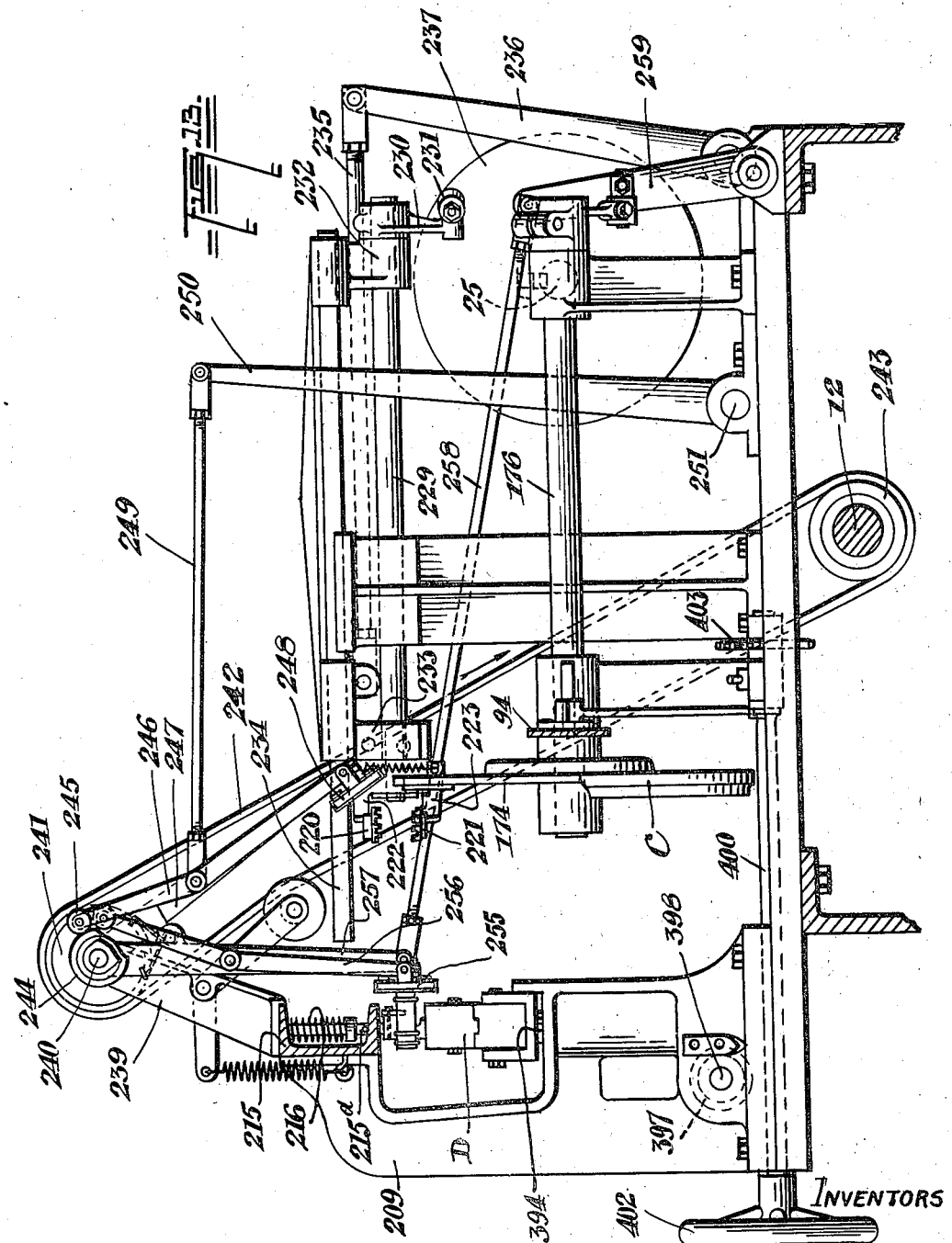

March 10, 1936.   L. W. SIMMS ET AL   2,033,258
BRUSH MAKING MACHINE
Filed Oct. 27, 1932   22 Sheets-Sheet 14
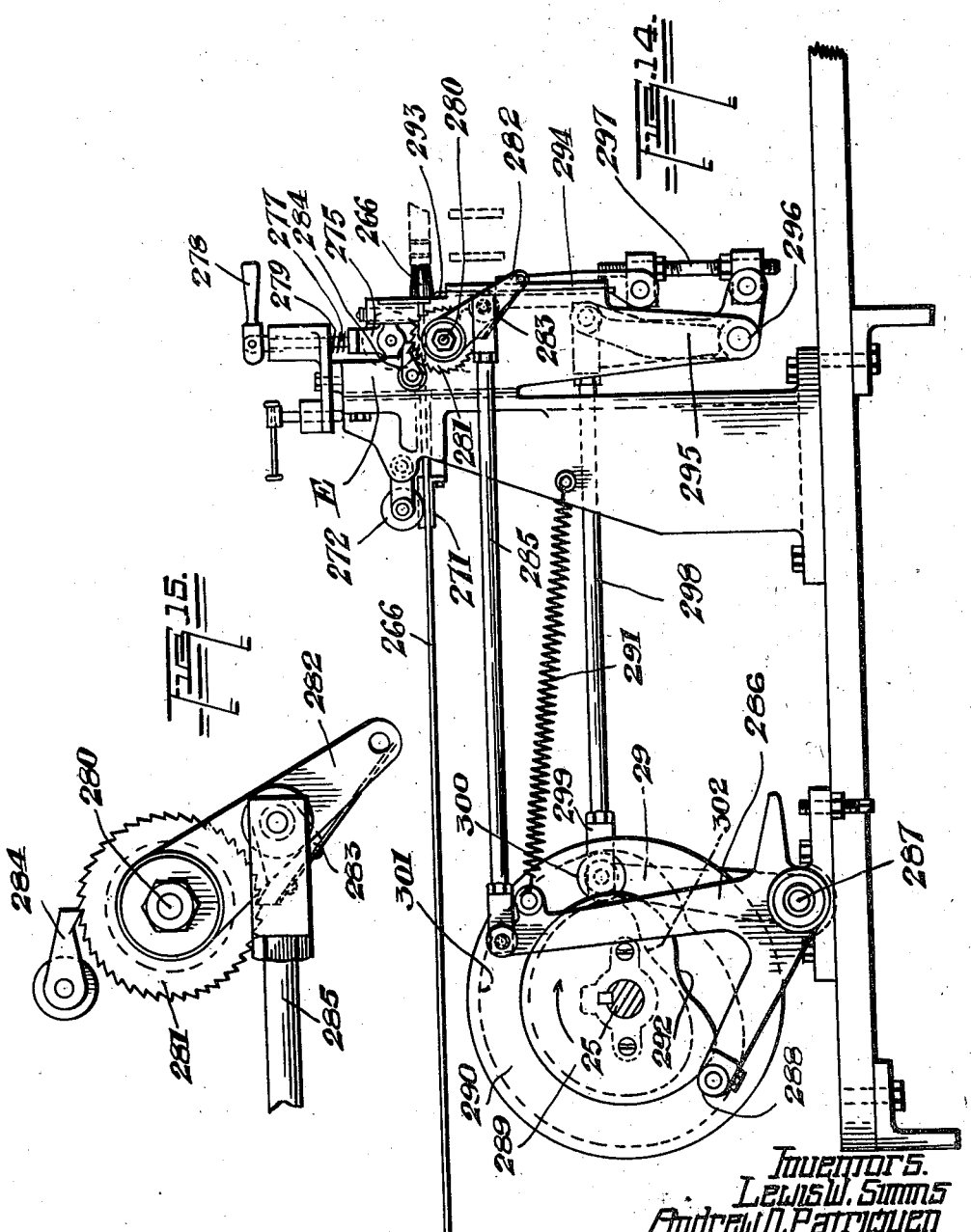

March 10, 1936.　　　　L. W. SIMMS ET AL　　　　2,033,258
BRUSH MAKING MACHINE
Filed Oct. 27, 1932　　　22 Sheets-Sheet 15
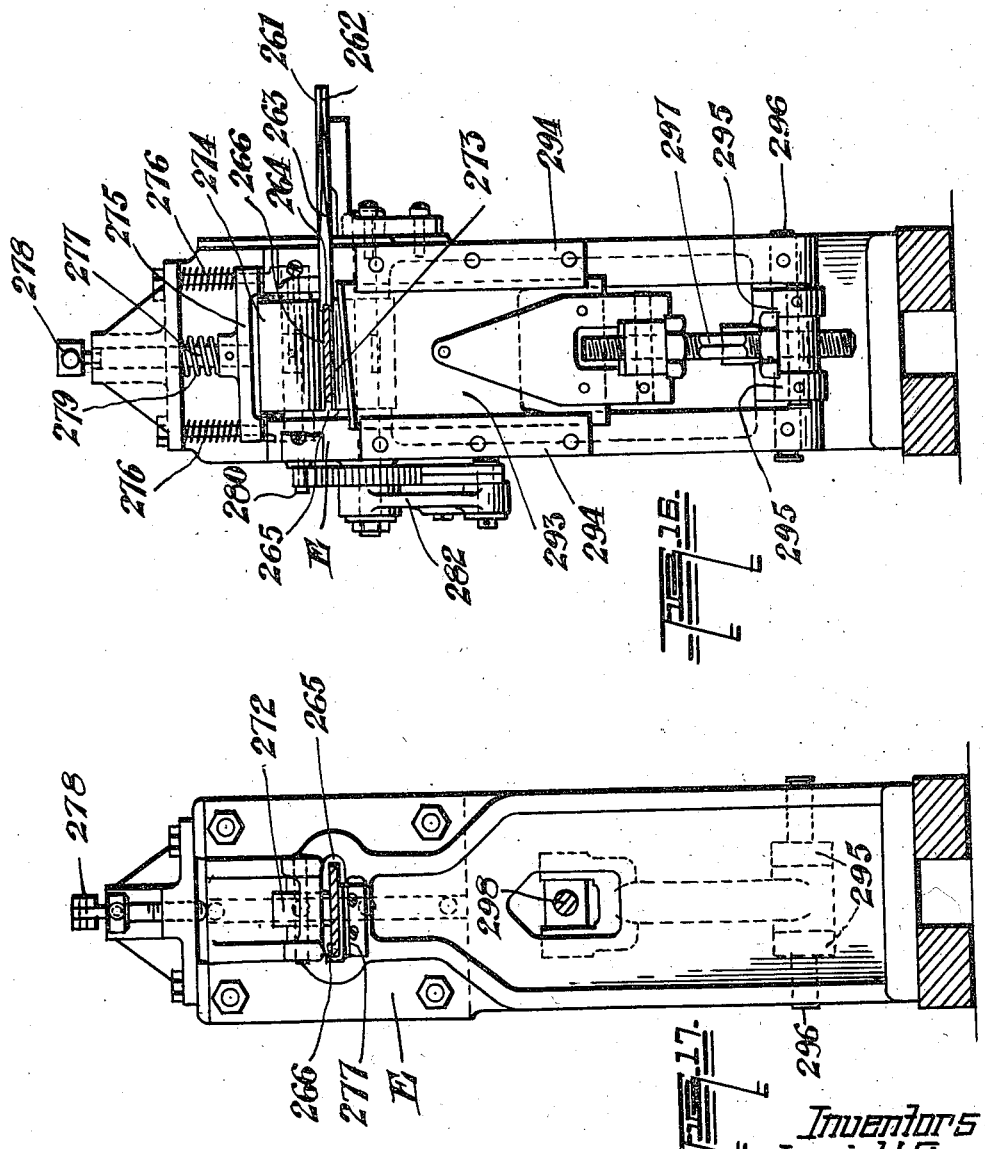

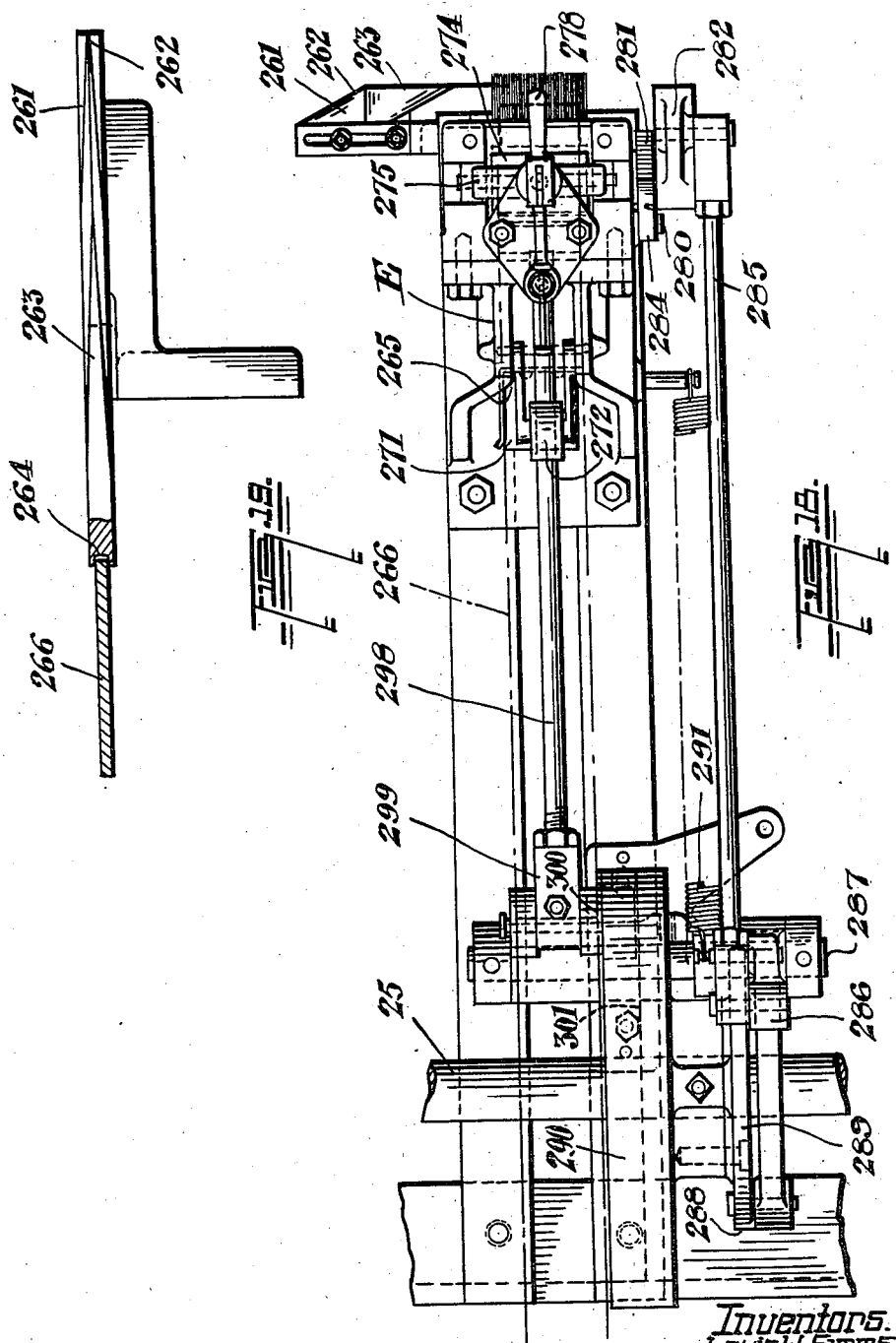

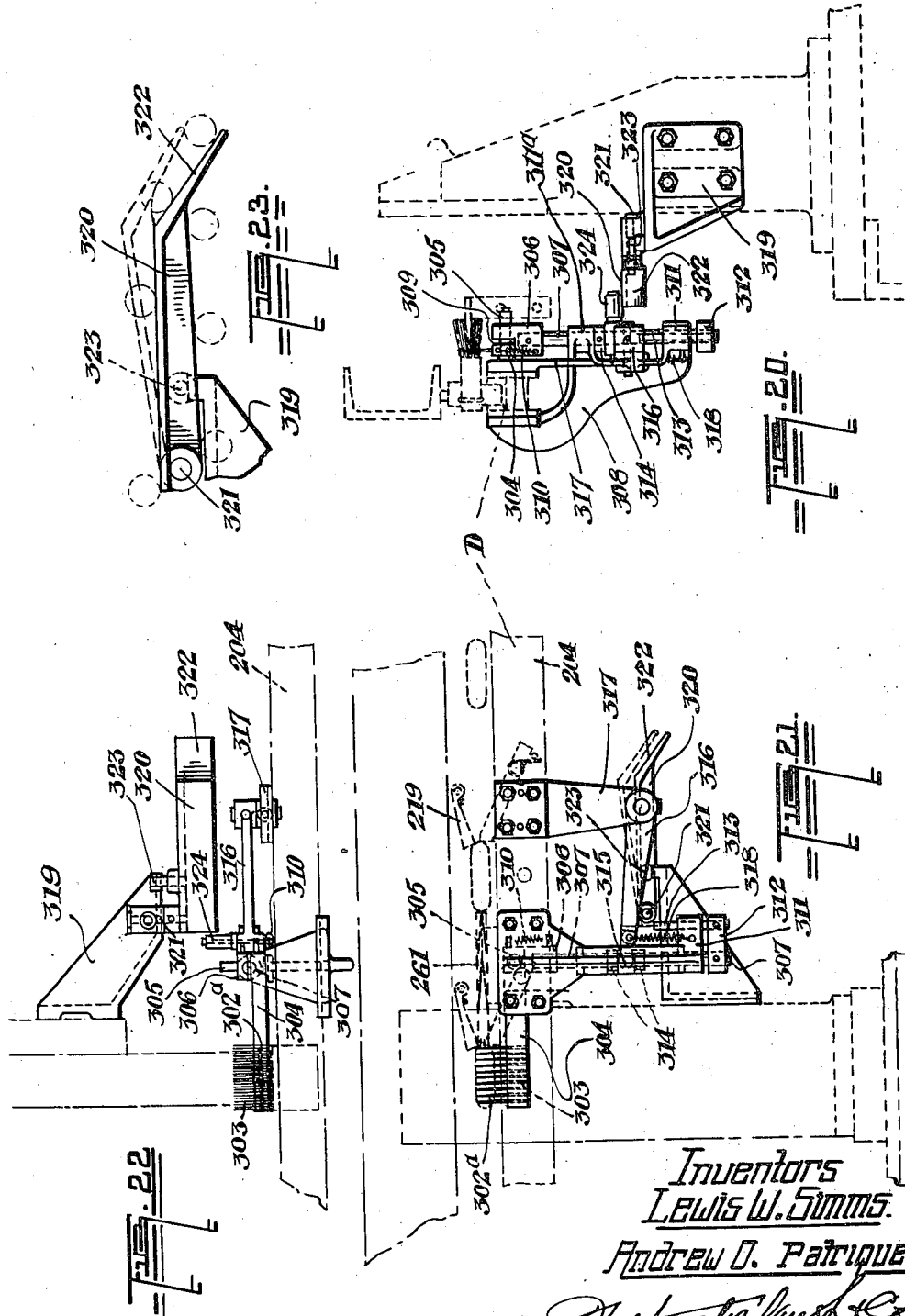

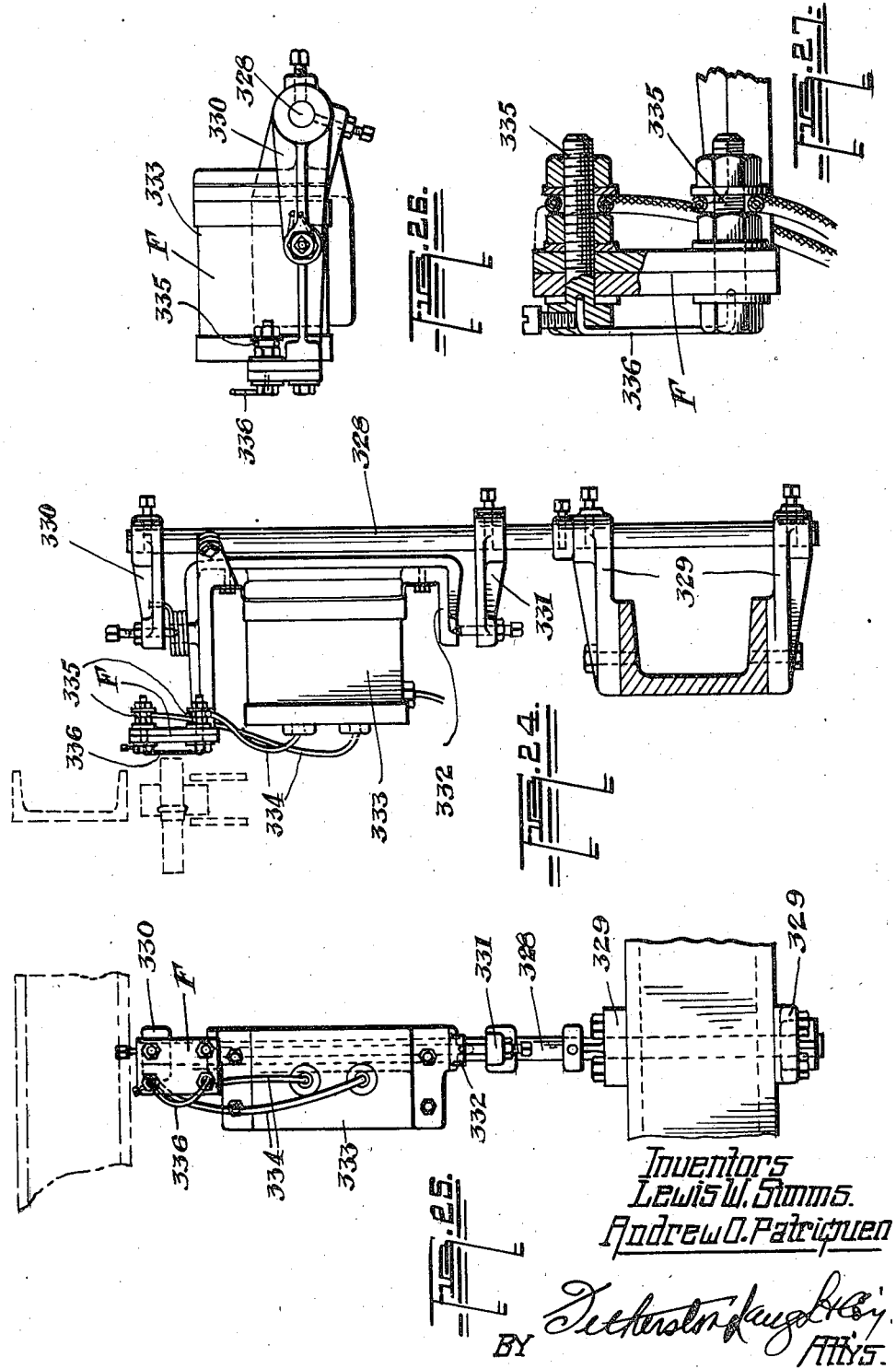

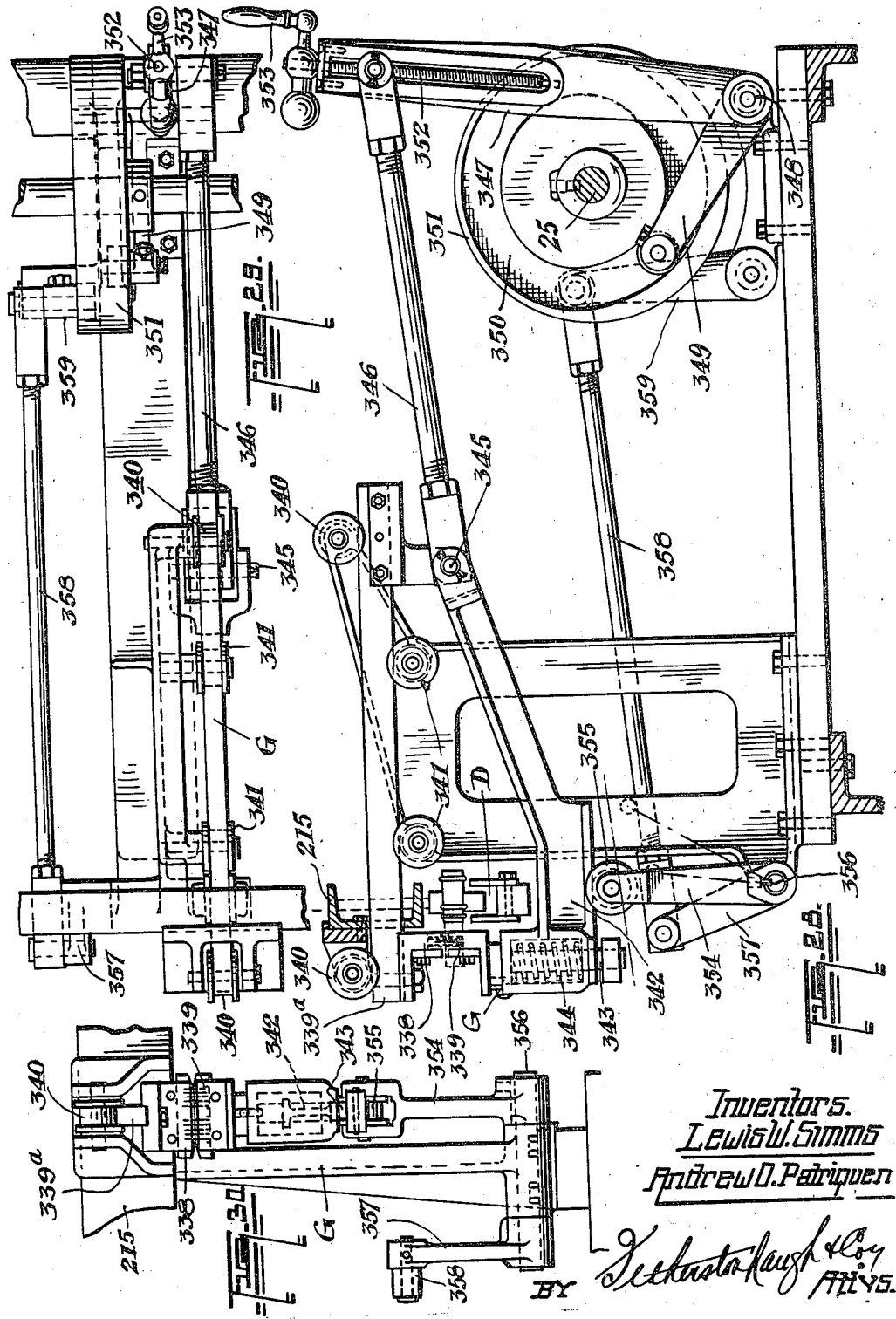

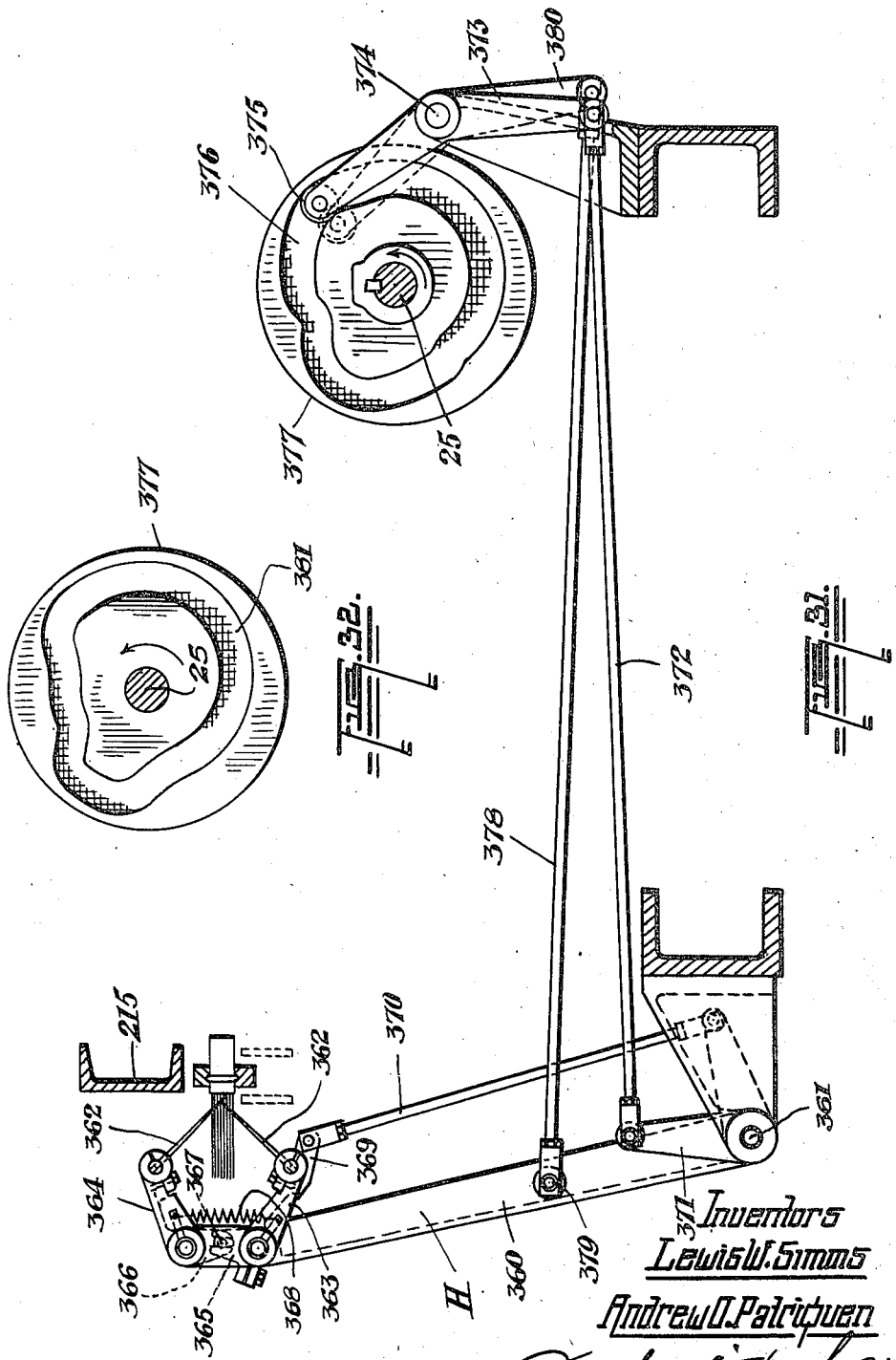

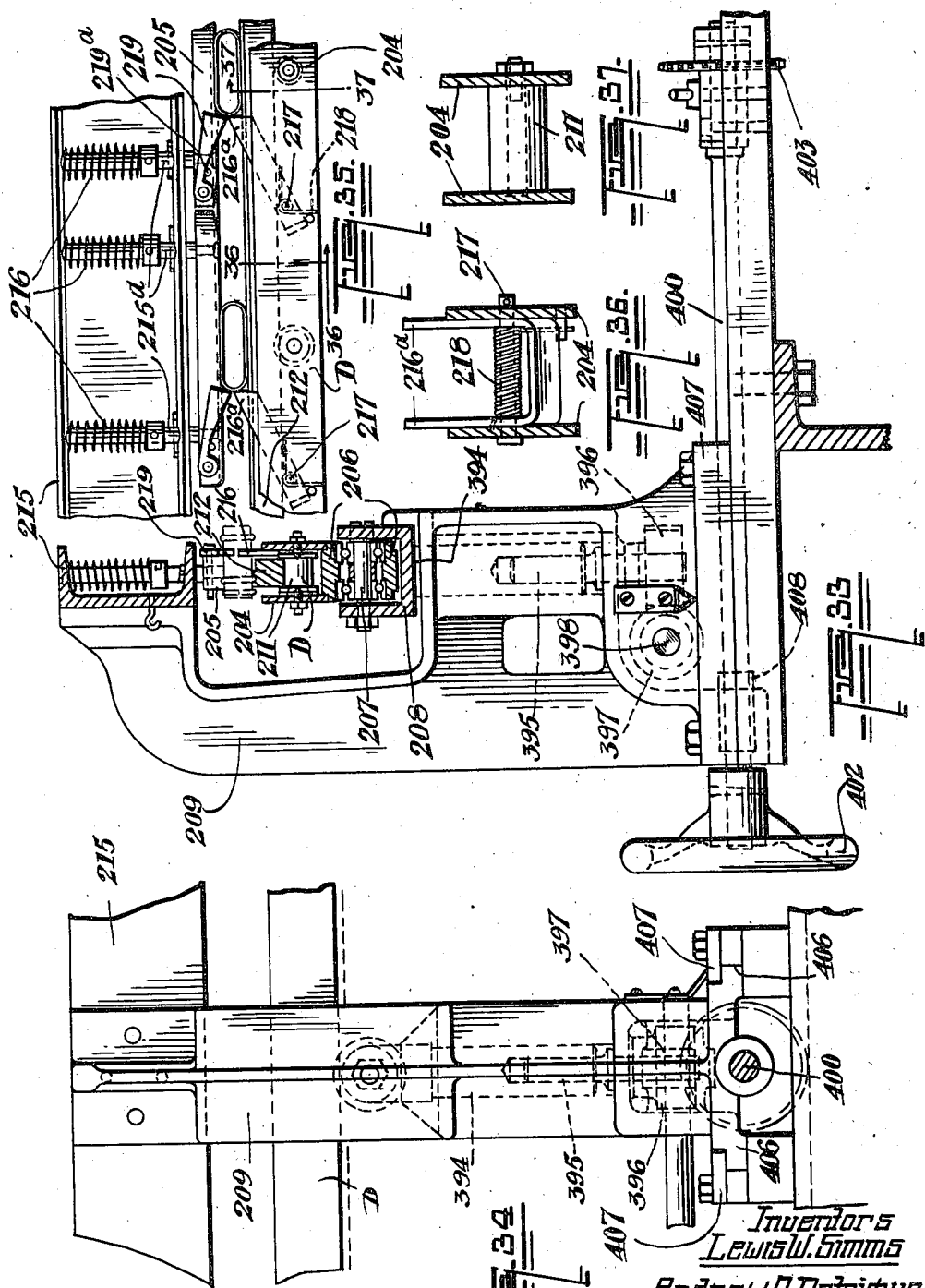

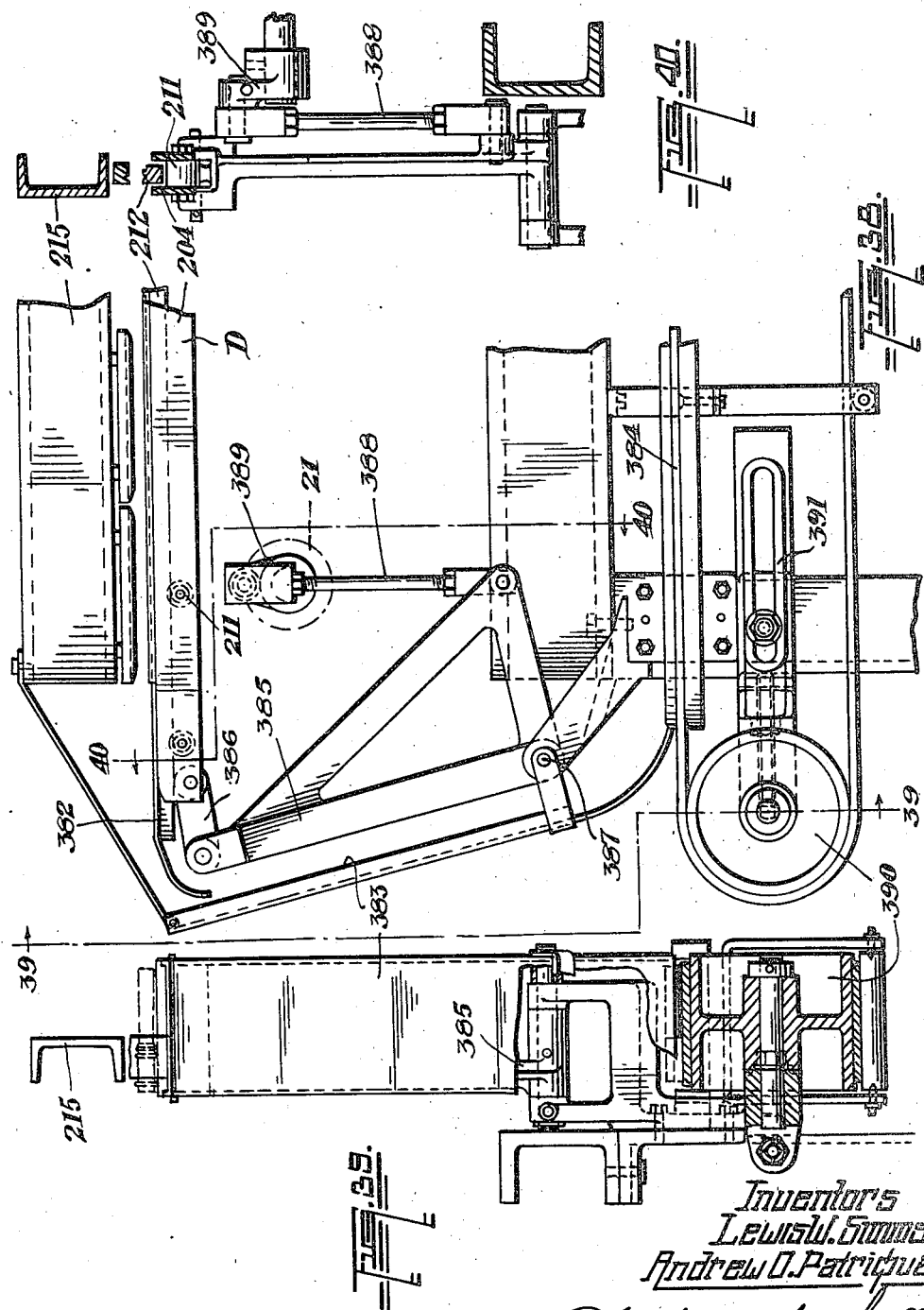

Patented Mar. 10, 1936

2,033,258

UNITED STATES PATENT OFFICE 2,033,258

BRUSH MAKING MACHINE

Lewis W. Simms and Andrew O. Patriquen, St. John, New Brunswick, Canada, assignors to Devoe & Raynolds Company, Inc., New York, N. Y., a corporation of New York Application October 27, 1932, Serial No. 639,790

51 Claims. (Cl. 300—2)

This invention relates to brush machines, and more particularly a machine for manufacturing brushes of the paint brush type.

An object of the invention is to provide a machine which when fed with bristles, will manufacture paint brushes automatically, to a phase in production prior to the cementing of the bristles and the insertion of the handles in the ferrules.

A further object of the invention is to provide, in mechanism of this character, a novel form of automatic means for controlling and regulating the feeding of bristles through the machine to permit the gathering of bristles into groups to form knots of uniform size without congesting the machine, regardless of how thickly or thinly the bristles may be disposed on the conveyor.

A further object of the invention is to provide a machine which will firmly hold and carry brush ferrules in a novel manner as they pass through the machine, and in which the bristle handling mechanism and ferrule carrying mechanism co-operate to unite both brush forming elements, finally to assemble the main portion of the brush.

A still further object of the invention is to provide a novel method of wedging the bristles within the ferrule and operative mechanism to carry out this operation.

A still further object of the invention is to provide novel trimming means and mechanism for firmly setting the bristles within the ferrules.

With these and other objects in view the invention briefly comprises a number of co-operating units and associated mechanism acting to assemble bristles and ferrules into brush units. The machine includes mechanism for feeding bristles into the machine prior to separation into knots to form individual brush units and associated with this mechanism in this phase of operation is provided a unit for combing and straightening the bristles so that they are delivered to a further manipulating apparatus in uniform arrangement. The machine employs a novel control for the feeding mechanism adapted to control and regulate the movement of the bristle feeding conveyor and designed to regulate the movement of a feeding finger to present bunches of bristles to knot picking apparatus to form knots of uniform size, regardless of the amount of bristles being carried on the bristle conveyor.

As the bristles are separated into knots, ferrules are carried into the machine and delivered to a ferrule transfer unit which carries the ferrules through the machine in a series of intermittent steps in which the ferrules, during their travel, remain stationary at certain points along the machine. When the bristles have been delivered to the knot picker to form a knot, each knot of bristles is carried by the knot picker to a point to register with a momentarily stationary ferrule, and mechanism is provided for removing each knot of bristles from the knot picker and for positively inserting it partially within the registering ferrule. From this point the partially inserted knot of bristles are patted in various stages to set them more firmly within the ferrules, and while still projecting from the rearward end of the ferrule to which they are first introduced, they have inserted between sections of them, a wedge made up of fibrous material such as cardboard introduced by a cardboard or paper inserting device of novel construction. Upon passing this phase of operation the projecting bristles and carried wedge are firmly patted to drive the bristles into the ferrule flush with its rearward end whereupon they are passed adjacent to means for trimming off any bristles projecting from the rearward end, said means being in the form of a singeing apparatus or clipping mechanism. The brush units are then acted upon by pulling mechanism which pulls the bristles and inserted wedge forwardly in the ferrule to a position which is the normal position which they will assume to form a proper brush, and after this pulling operation they are subjected to a final combing operation to finally straighten out the bristles of each brush unit whereupon they are discharged to a conveyor to be taken to a further source of processing fully to complete the brushes.

The invention will be fully outlined in the following description in conjunction with the drawings forming part of this application.

Referring to the drawings, Figs. 1 and 1A jointly illustrate a front elevation of the complete machine.

Figures 2, 2A and 2B collectively illustrate a complete top plan view of the machine.

Figure 3 is a slightly enlarged elevation of the right hand end of the machine as viewed in Fig. 1.

Figure 4 is an enlarged detail partly in section of the bristle feed conveyors and some of the bristle patting structure and associated mechanism.

Figure 5 is an enlarged detailed view of the preliminary bristle combing mechanism and the bristle feed conveyors at the point of combing.

Figure 6 is an enlarged detail view partly in section taken on the line 6—6 of Fig. 5.

Figure 7 is an enlarged detail front elevation of the controlling mechanism for the feeding of the bristles to the knot picker including a view of the knot picker.

Figure 8 is a section on the line 8—8 of Fig. 7 showing the drive for the bristle feeding conveyor and ferrule conveyor.

Figure 9 is an enlarged detailed view of the knot picker and the bristle feeding finger.

Figure 10 is a top plan view of Figure 9.

Figure 11 is an enlarged detail of the knot picker showing the closure knife operating to close over the bristle receiving mechanism in the knot picker.

Figure 12 is an enlarged view of the knot picker similar to Fig. 11, but showing the knot picker moved to its one extreme position carrying the bristles to a position for transfer to the ferrules, the clamping jaws for carrying the bristles in this manner being also illustrated.

Figure 13 is an enlarged side view of the knot picker and associated mechanism showing the clamping jaws in their relative position to receive bristles from the knot picker and illustrating the patting mechanism and ferrule conveyor with the ferrule positioned therein.

Figure 14 is an enlarged side elevation of the cardboard inserting mechanism illustrating a brush in a position to receive a cardboard insert and also illustrating the operating mechanism for the various parts.

Figure 15 is an enlarged detail of the ratchet mechanism employed in Fig. 14.

Figure 16 is an enlarged front elevation of the cardboard inserting machine illustrating the bristle dividing knife and the cardboard cutting knife.

Figure 17 is an enlarged rear view of the cardboard inserting mechanism illustrating the manner in which the cardboard passes through the mechanism and the positioning of the connecting rod for the cutting knife.

Figure 18 is an enlarged top view of the cardboard inserting machine as viewed in Fig. 14.

Figure 19 is an enlarged view of the knife separating the bristles mounted on the front of the cardboard inserting mechanism and illustrating the cardboard insert projected alongside of the knife.

Figure 20 is an enlarged side elevation of the mechanism employed for supporting the bristles of a brush unit when being passed over the bristle separating knife of the cardboard insert machine.

Figure 21 is an enlarged front elevation of Fig. 20 showing a comb inserted within the bristles of a brush unit.

Figure 22 is an enlarged top plan view of Fig. 21.

Figure 23 is a further enlarged detail view of the movable guideway for controlling the movement of the comb into and out of engagement with the bristle of the brush units as illustrated particularly in Fig. 21 and also illustrating in dotted lines the other extreme position of this guideway and also the various positions of the roller which moves in contact with the guideway.

Figure 24 is an enlarged side elevation of the singeing unit employed in the machine.

Figure 25 is a corresponding front elevation of Fig. 24.

Figure 26 is a top plan view of Fig. 24.

Figure 27 is an enlarged sectional detail of the mounting and connection of the resistance unit in Fig. 24.

Figure 28 is a side elevation of the mechanism employed for gripping and finally pulling the bristles into their normal position within the ferrule prior to their discharge from the machine.

Figure 29 is a top plan view of Fig. 28.

Figure 30 is a front elevation of Fig. 28.

Figure 31 is an enlarged side elevation of the final combing mechanism illustrating the combs in relation to the bristles of a brush unit in the ferrule transfer mechanism, and operating cam.

Figure 32 is an enlarged side elevation of the other side of the operating cam shown in Fig. 31.

Figure 33 is an enlarged sectional elevation of the ferrule transfer mechanism showing the frame supporting structure and a ferrule carried in the transfer mechanism in addition to also illustrating the means for adjusting the ferrule transfer mechanism to suit various sizes of the ferrules.

Figure 34 is a front elevation of Fig. 33.

Figure 35 is an enlarged rear elevation of the ferrule transfer mechanism and part of the frame as shown in Fig. 33.

Figure 36 is an enlarged sectional detail of the dogs carried by the movable portion of the ferrule transfer mechanism in accordance with a section being taken on the line 36—36 of Fig. 35.

Figure 37 is a section taken on the line 37—37 of Fig. 35.

Figure 38 is an enlarged front elevation of the rear end of the machine showing the operating means for moving the ferrule transfer mechanism and also illustrating the discharge chute for the ferrules and the conveyor for receiving the ferrules from the discharge chute.

Figure 39 is a section taken on the line 39—39 of Fig. 38.

Figure 40 is a section taken on the line 40—40 of Fig. 38.

Figure 41 is an enlarged sectional detail illustrating the grooves formed in the ferrule transfer mechanism for receiving the projected head on the ferrules and holding them in a definite position while passing through the ferrule transfer mechanism.

Figure 42 is an enlarged longitudinal section taken through one of the ferrules after the bristles have been inserted from the knot picker.

Figure 43 is a similar view to Fig. 42, but showing the bristles after they have been patted more firmly in the ferrule and have received the cardboard insert.

Figure 44 is a similar view to Fig. 43 showing a further step in the manufacture after the bristles with the cardboard inserts have been driven into the ferrule flush with the inner end thereof.

Figure 45 is a similar view to Fig. 44 but illustrating a brush unit after the bristles have received their final pull to place them in their normal position as in a finished brush.

Referring to the drawings, the machine includes the various units successively acting to assemble the brush units, the location of each unit being clearly indicated in Figures 1, 1A, 2, 2A and 2B. The bristles are first fed to the combing unit A and after combing are fed in timed relation through a bristle feed control unit B to the knot picker C which carries enough bristles to be presented to ferrules carried by the ferrule transfer mechanism D. The ferrules carrying the bristles are then passed to the cardboard insert unit E to receive a cardboard wedge and are then presented to the trimming unit F which trims off bristles protruding from the end of the ferrule and after passing through further minor operations the bristles are pulled into proper position by a final pulling mechanism G and before passing from the machine are acted upon by a final combing unit H.

The machine will now be described in detail to explain fully its construction and operation.

Drive

On a suitable frame, preferably made up of supporting castings 10 secured as a rigid unit by the rods 11, is carried a main drive shaft 12 which is journalled at each end of the frame as at 13 and extends the full length of the framework. The main drive shaft is a high speed shaft preferably operating at 500 R. P. M. and is driven from a motor 14 mounted on the lower part of the framework and connected by the belt connection 15 to the pulley 16 which is connected through suitable clutch mechanism (not shown) with the drive shaft. The clutch mechanism may be of any suitable type and is preferably controlled through a rod positioned on the forward part of the framework and provided with operating hand grips spaced throughout the length of the machine so that the clutch may be thrown in or out from practically any point along the machine. The main drive shaft 12 through the medium of reducing units and by direct connections is designed to operate all parts of the machine.

Through the medium of a sprocket 17, secured to the main drive shaft 12 towards the rearward end of the machine, which drives the chain 18, the sprocket 19 on the shaft 20 of the reducing unit 21 is driven. The reducing unit includes reduction gearing through which the main shaft 22 of the unit is driven at a lower rate of speed and by means of the bevel gear 23 keyed on the end of this shaft and meshing with bevel gear 24 secured on the cam shaft 25, the cam shaft is driven at a suitable speed. The cam shaft is designed to control the operation of various units of the machine as will hereinafter be referred to. Toward the middle of the machine the main drive shaft is connected by the chain and sprocket connection 26 with the drive shaft 27 of the reducing unit 28 and through the medium of suitable reducing gears carried by the unit 28 the main shaft 29 of this unit is driven at the proper relative speed. The reducing unit 28 operates the mechanism controlling the bristle feed and other adjacent units as will be later described.

Bristle conveying

The bristles are carried into the machine preferably by means of the endless chain conveyors 30 and 31 spaced apart from one another a sufficient distance to readily carry bristles between them as illustrated in Fig. 2, and, upon movement of the chains in a direction towards the rearward or left hand end of the machine, the bristles are carried through that section of the machine over which the conveyor chains 30 and 31 extend, and during this travel are acted upon as will be referred to. The conveyor chains are preferably two in number operating to carry the bristles preferably in conjunction with a guide member 33 rigidly positioned on the frame extending between and parallel with the chains throughout a portion of their extent. The conveyor chains 30 and 31 when they are operated carry the bristles through to the preliminary combing mechanism A and to a point adjacent the knot picker C but prior to passing the bristles to this combing mechanism the bristles are first straightened to pass them to the combing mechanism in a fairly uniform order.

Upon the outer side or front of the framework is mounted a vibrator 34 (Figures 1 and 2) which consists of a flexible member preferably of thin steel anchored at one end to the frame as at 35 by means of a suitable clamping device and resiliently anchored at its opposite end to a part of the frame or other rigid support by means of a coil spring 36. The vibrator is preferably bent as at 37 and provided with a bearing pad 38 on its inner surface, this pad preferably being made of leather. Through the medium of the coil spring 36 the bearing pad is held into engagement with a multi-sided agitator 39 which is rotatably carried on a suitable vertical axis and, by means of the pulley 40 mounted on this vertical axis, the agitator is rotated so that the agitator intermittently contacts with the bearing pad 38 a plurality of times during one revolution to rapidly vibrate the vibrator 34. This vibrator constitutes means for preliminarily straightening the bristles before they are placed on the conveyor chains 30 and 31, since the operator after grasping a bunch of the bristles merely holds the butts of the bristles against the vibrator which, due to its action, automatically evens the bristles so that they may be placed upon the conveyor collectively, in a fairly uniform condition. The pulley 40 of the agitator 39 is rotated through the belt 41 which passes over suitable guide pulleys on the framework and is driven by the main pulley 42 keyed on the main drive shaft 12.

After the bristles have been placed upon the conveyor chains 30 and 31 and the chains are moved, during operation of the machine, to carry the bristles into the machine, they are acted upon from both sides to even the ends of the bristles, the bristles being gently agitated to obtain this result. To this end the vibrator 43 is mounted on the machine on the inward side of the conveyor chains, the vibrator being anchored at one end as at 44 in a substantially rigid connection and resiliently anchored at its opposite end by means of the coil spring 45, see Fig. 2. The vibrator may also be provided with a hinge connection 46 intermediate of its length. The vibrator serves as a guide for one end of the bristles being fed into the machine and by means of the rotary agitator 47 similar to agitator 39 which contacts with the bearing pad 48, the vibrator 43 is gently and rapidly vibrated to contact with the ends of the bristles so that they are evened with respect to one another. The agitator 47 is driven by means of a pulley 49, belt 50 and a drive pulley carried on the main shaft 12.

Extending throughout a limited length of the vibrator 43 but positioned on the opposite side of the conveyor chains is a second vibrator or patter 51 which is in the form of a metal band being outwardly bent at one end as at 52 to provide a guide for the outward end of the bristles being fed into the machine, as particularly illustrated in Fig. 2 and as the bristles are fed along into the machine the ends of any bristles projecting a substantial distance forwardly of conveyor chain 30, are guided by the end of this vibrator to a normal position. This vibrator or patter is rigidly mounted on the fittings 53 which are connected to levers 54 rigidly mounted on the transverse shaft 55 (see Fig. 4) which is supported by the journal bearing support 56 mounted on the frame. Rigidly fastened to the shaft 55 is an operating lever 57 which is reciprocated by means of the connecting rod 58 and eccentric mechanism 59 operated from the main shaft 12 to reciprocate rapidly the levers 54 and the patter 51.

Therefore, the bristles during their travel between the vibrator 43 and patter 51, are fairly uniformly arranged between the conveyor chains 30 and 31 prior to their presentation to the preliminary combing mechanism A.

*Preliminary combing mechanism*

Referring more particularly to Figs. 1, 2, 3, 5 and 6, the preliminary bristle combing unit A includes the cross shaft 60 on which is mounted the main sprocket 61 over which the conveyor chain 31 is designed to pass, the sprocket 61 being secured on the shaft 60 in a position aligned with the longitudinal axis of this chain. Above and to each side of the sprocket 61 are positioned the sprockets 62 and 63 mounted respectively on the shafts 64 and 65, the shaft 64 being held by the parallel arms 66 and 67 (see Figs. 2 and 5) on the shaft 60 and the shaft 65 being held by the cross-link 68 swingably mounted on the shaft 64. The sprockets 62 and 63 are designed to carry between them the endless chain 69 which passes directly above the conveyor chain 31, see Fig. 6. The sprockets 62 and 63 are designed to be driven in timed relation with the sprocket 61, the latter sprocket being driven through the medium of the conveyor chain 31. To this end the gear 70 is mounted on the shaft 60 and is designed to mesh with the gear 71 mounted on the shaft 64, so that as the sprocket wheel 61 is rotated the sprocket wheel 62 is rotated through the medium of these gears and chain 69 and sprocket wheel 63 are therefore driven from the sprocket 62.

The endless chain 69 is designed to co-operate with the conveyor chain 31 as it passes over the sprocket wheel 61 and this chain is normally urged towards the chain 31 in this area by means of a weight 72 (see Fig. 1) which through a suitable rod, cable or the like 73 is attached to the cross-link 68 as at 74 (see Fig. 5) so that as the conveyor chains 30 and 31 move, carrying the bristles into that area of the machine below the sprocket 63, the bristles are firmly pressed between the endless chain 69 and the conveyor chain 31 and consequently have one end gripped by these chains (see Fig. 6). They are therefore carried around the sprocket wheel 61 with one end freely projecting beyond this sprocket wheel and conveyor chains, towards the front of the machine. To firmly maintain the bristles in this relation as they are first started over the sprocket wheel 61, the pressure roller 75 straddles the chain 69 and contacts with these bristles, the pressure roller being held by the swingable arm 76 rotatably mounted on the shaft 65.

As the bristles in passing over the sprocket 61 between the chains 69 and 31 reach a point substantially over the shaft 60 they are firmly held in a most suitable position for combing to eliminate any tangles and to straighten and uniformly arrange the bristles prior to the succeeding operations. On a suitable superstructure 77 forming part of the mounting of the shaft 60 and extending thereabove, is mounted a supporting bracket 78 which carries a reciprocable arm 79 to which is pivotally attached the free end of the shank 80 of a comb 81. Journaled in the supporting bracket 78 is a shaft 82 which is connected with a pulley 83 at one end and at the opposite end has rigidly attached thereto the crank arm 84. The free end of the crank arm 84 is pivoted to the shank 80 of the comb 81 intermediately of its length as at 85 and through the medium of the belt 86 passing around pulley 83 extending over suitable pulleys on the framework, and driven from pulley 87 on the main drive shaft 12, the shaft 82 is rotated so that crank arm 84 is similarly rotated. Consequently the comb 81, by reason of the connection of its shank with the crank arm 84 and reciprocating arm 79, is caused to move through a substantially elliptical path (see Fig. 6) so that the teeth of the comb as it moves through this path dip downwardly into the bristles projecting from the chains 31 and 69 and pass cleanly through the bristles to efficiently comb them, the comb being operated continuously throughout the operation of the machine. The bristles, after they are combed, continue to pass over the remainder of the periphery of the sprocket wheel 61 gripped between the chains and when they reach a point substantially below the sprocket 62 they again come into contact with the conveyor chain 30 and by the time they pass from under the sprocket wheel 62 they again lie evenly upon the conveyor chains 30 and 31 to be passed on into the machine.

For the purpose of firmly holding the bristles in their position upon the conveyor chains 30 and 31 as they pass from the bristle combing unit A, an endless cable 88 is designed to pass into proximity just above these conveyor chains and just beyond the combing unit in an area between the chains. The cable is adapted to extend over the pulley 89 which is mounted on the shaft 64 and extends over a further pulley 90 which is mounted on a stub shaft 91 carried by the supporting arm 92 which is mounted from a further part of the framework, thus the cable 88 moves with the conveyor chains 30 and 31 and presses against the upper surface of the layer of bristles carried on the chains and constitutes means for holding the bristles in their set position.

As the bristles are travelling from the combing unit to the knot picking unit C they are agitated from both sides to positively and finally set the ends of the bristles in uniform line by means of the patting unit 93 on one side of the conveyor chains and the vibrating member 94 on the opposite side of the chains. The vibrating unit 94 is of a character similar to the vibrator 43 resiliently anchored to the frame by coil spring 95 at one end and rigidly connected to a stationary member on the frame at the opposite end as at 95ª being provided with the hinge connection 96 and vibrated by the rotary agitator 97 belt connected as at 98 to a pulley on the main drive shaft 12. Thus one section of the member 94, that is starting from the end where it is anchored by the coil spring 95 and up to the hinged connection 96, will be fairly rapidly vibrated but the other section extending from the hinged connection 96 to the rigid mounting 95ª will be vibrated only slightly and consequently serve more as a guide to the ends of the bristles.

The patting unit 93 is pivotally connected at one end to the frame as at 99, the connection to the frame at this end being adjustable so that the free end of the patter may be moved towards or away from the chains according to requirements. The free end of this patter is designed to project towards the front of the machine at an angle so that it may serve to replace, in normal position, any bristles which perchance may be abnormally projecting from the conveyor chains.

The patting member 93 is preferably formed with the hinged connection 100. Between the hinged connection 100 and the opposite end 101 of the patter it is connected with a pair of units for vibrating particularly this section of the patter. The first connection is with the fitting 102 which through the swinging arm 103 and the rod 104 in turn connected to the eccentric control mechanism 105, mounted on the main drive shaft 12, serves to reciprocate the patter 93. Also connected with the patter towards its opposite end is the fitting 106 connected to the lever 107, which through the eccentric mechanism 108 and its connecting rod pivotally connected to this lever, serves to vibrate or reciprocate the opposite end of the patter in unison with the first reciprocating unit. Consequently, as the bristles pass on the feed chains in that area of the machine next to the patting unit 93 and pass the pivotal connecion 100 the patter will agitate one end of the bristles throughout its extent and thus provide for the final uniform arrangement of the bristles before being delivered to the knot picker C. The bristles then pass directly to a point where they are carried in groups to the knot picker which takes a uniform knot of the bristles to a further point in the machine as will be described hereinafter.

*Driving of the bristle conveyor and ferrule feed*

Upon the main shaft 29 of the reducing unit 28 is mounted a sprocket 109 chain connected to a sprocket 110 on the cross shaft 111. Carried on the shaft 111 is a gear 112 and the driving sprockets 113 and 114 of the conveyor feed chains 30 and 31. The sprockets 113 and 114 and the gear 112 are mounted on collars or sleeves connected together so that these three members are moved together, the collars or sleeves being loosely mounted on shaft 111 and consequently, when shaft 111 is rotated by means of the sprocket 110, the sprocket 115 mounted on the extreme end of the shaft will be the only member which will rotate with the shaft. Upon the counter shaft 116 mounted directly above shaft 111 and constituting the driving shaft for the bristle conveyor, is mounted a ratchet wheel 117 which is designed to be rotated intermittently by means of the pawl 118, spring held on the reciprocable arm 119, the latter being operated by mechanism hereinafter referred to. Consequently when the shaft 116 is rotated in a clockwise direction, through the medium of the gear 120 keyed thereon and meshing with gear 112, this gear and the commonly connected sprockets 113 and 114 will be caused to rotate in a counter-clockwise direction, thus moving the chains 30 and 31 to feed bristles into the machine.

Upon the shaft 116 mounted directly above the sprockets 113 and 114 are sprockets 121 and 122 which carry the endless guide chains 123 and 124 which extend directly above the feed chains 30 and 31 over a limited length thereof as measured from the sprockets 113 and 114, the chains 123 and 124 passing over sprockets 125 and 126 (see Fig. 2A) which are mounted on the shaft 91 carried by the arm 92, the pulley 90 over which passes the cable 88 being also mounted on the shaft 91 as previously explained. Therefore as the bristles in passing through the machine on the chains 30 and 31 move out of contact with the cable 88 they are held between the conveyor chains 30 and 31 and the chains 123 and 124, since the returning sections of these chains during this travel as illustrated particularly in Fig. 6, lie adjacent the upper surface of the chains 30 and 31 and the bristles are held therebetween. The chains 123 and 124 also serve as a further conveying medium in conjunction with the chains 30 and 31 in the final conveying of the bristles towards the knot picker C, since these chains are driven from the shaft 116 in synchronism with the chains 30 and 31. The chains 123 and 124 also serve to compress the bristles as they are being fed to the knot picker so that they cannot lie loosely upon the chains in this stage of the operation.

On the outer end of the shaft 116 is mounted a hand wheel 127 which may be used to advance or retract the feed chains when the machine is not in operation. For instance where, for any reason the bristles may become congested between the feed chains, this hand wheel after the machine is stopped may be operated in a counter-clockwise direction, thus moving the feed chains 30 and 31 and the guide chains 123 and 124 in the opposite direction and consequently moving the bristles in the opposite direction.

The sprocket 115 on shaft 11 is designed to drive chain 128 which passes over the tightener sprocket 129 loosely mounted on shaft 116 and the drive sprocket 130 of the ferrule feeding unit J referred to hereinafter.

The bristle conveyors 30 and 31 and the guide chains 121 and 122 are designed as previously stated to be intermittently driven through the medium of the ratchet wheel 117 and this drive is effected in conjunction with an automatic bristle feed control to the knot picker which will now be described.

*Automatic bristle feed control*

When the bristles pass from between the conveyor chains 30 and 31 and the chains 123 and 124 they are received in the stock box K defined by an area of the vibrator 93, the patter 94 and a rigid plate 131 forming a bed which extends between the knot picker G and the end of the bristle conveyor chains, as particularly illustrated in Fig. 9. The plate 131 is provided with a reduced projecting end 132 (Fig. 10) which extends between the sprockets 113 and 114 so that the bristles are guided directly on to this plate from the conveyor chains and cannot in any instance be dropped down through the machine as they are passing from the end of the conveyor to the stock box. The bristles slide along this plate being pushed by the succeeding bristles intermittently fed from the conveyor and, they are fed from the plate to the knot picker in groups, by means of a feeding finger 133 which is connected to the swinging arm 134 pivotally mounted as at 135 on the beam 136 in turn pivotally mounted as at 137 on an upright support 138 rigidly carried by the frame.

The feeding finger 133 is moved into and out of contact with the bristles to feed a group thereof to the knot picker, the size of the group being regulated according to the extent of travel of the finger 133. The extent of travel of the finger is automatically regulated by the amount of bristles which are fed to the plate or bed 131 so that if there is a thick layer of bristles on this plate, the feeding finger 133 will travel forwardly only a limited distance to feed a bunch of bristles to the knot picker, while on the other hand if there is a thin layer of bristles on the plate 131 the finger will sweep forwardly a greater distance so as to sweep a substantially equal quantity of bristles towards the knot picker.

The finger 133 is reciprocated backwardly and forwardly by means of the rod 139 pivotally connected at one end to the swinging arm 134 (Fig. 7) and rigidly secured at its opposite end preferably through the adjustable connection 140 to the rack 141 formed with a toothed upper surface 142. The rack 141 is pivotally connected as at 143 to the bell crank lever 144 which is pivotally mounted on the frame as at 145, the opposite arm 146 of lever 144 projecting below the supporting bed of the machine and being connected to a weight 147 adjustable along the arm by any suitable means, such as the orifices 148, to vary the weight on this lever and consequently control the distance that the arm 134 is thrown. It is apparent therefore that through the medium of the wight 147 the arm 134 and consequently the finger 133 is normally urged towards the knot picker.

The bell crank lever 144 is connected to the ratchet operating lever 149, preferably by means of the recessed link 150 designed to contact with the roller 151 slidably mounted by means of the slot 152 in the bell crank lever 144 so that the throw of lever 149 may be varied. The ratchet lever 149 through the link 153 is connected to the lever 119 by means of a slidable connection such as the block 154 and co-operating guideway 155. The lever 119 as previously explained carries the spring pressed pawl 118 designed to engage with the ratchet teeth on the periphery of the ratchet wheel 117 so that as the lever 149 is swung towards the right, the ratchet wheel 117 will be rotated through an arc corresponding with the swing of the lever 149 and consequently the feed chains 30 and 31 and the guide chains 123 and 124 will be moved correspondingly to feed bristles to the stock box K.

The lever 149 is moved during operation towards the right hand end of the machine by means of the lever 157 pivotally mounted on a stationary part of the frame as at 158 and pivotally connected as at 159 to a connecting link 160 in turn pivotally connected as at 161 to the lever 149 so that the levers 144, 149 and 157 move together. On the pivotal axis 159, the lever 157 carries a roller 162 which is designed to contact with the periphery of a main cam 163 which is carried on one end of the main shaft 29 of the reducing unit 28, one portion of the periphery of this cam being reduced to form the cam track 164 of gradually reduced radius, the cam track being positioned in line with the roller 162. Therefore during rotation of cam 163 contact between any portion of the surface of cam track 164 with roller 162 will cause lever 157 and levers 144 and 149 to move towards the right. Furthermore, as the weight swings levers 144, 149 and 157 towards the left, the cam is rotated to position the lowest point of cam track 164 opposite lever 157 which will permit the lever 157 to swing towards the cam to a maximum extent so that the finger 133 operated by lever 144 can be moved towards the knot picking unit C to a maximum extent if it is necessary that it move that far.

Pivotally connected to the beam 136 and intermediate of the pivotal connections 135 and 137 is a lifting arm 165 which is forked as at 166 to slide over a stationary guide 167 which is mounted on the end of the shaft 29 so that the arm 165 is capable of vertical reciprocable motion. To effect vertical movement of this arm a roller 168 is mounted thereon on one side and adapted to project into a suitable cam groove in the forward face of cam 163 designed intermittently to raise and lower arm 165 correspondingly to raise and lower the beam 136. Thus when the feeding finger 133 has reached its limit of travel towards the left hand end of the machine, delivering bristles to the knot picker C, the cam 163 at the appropriate moment through this cam groove raises arm 165 and beam 136 correspondingly to lift the finger 133 upwardly and, upon contact of the cam track 164 at this moment with the roller 162, lever 157 will be swung to the right thus moving bell crank lever 144. Consequently finger 133 will be pulled backwardly towards the right hand end of the machine and when it has reached its limit of travel in this direction the cam groove will cause the arm 165 to drop thereby dropping the finger 133 to enter into the bristles carried on the plate 131, preparatory to the forward swinging movement to again feed bristles to the knot picker through the action of the bell crank lever 144 and the weight 147. The finger therefore has four distinct motions, a forward swinging motion to deliver bristles to the knot picker C, a vertical lifting motion to remove it from contact with the bristles and position it in spaced relation above the plate 131, a backward swinging motion to position it above the bristles on the plate 131 which are to be moved toward the knot picker, and a downward motion to cause it to enter into the bristles preparatory to sweeping them towards the knot picker.

It is apparent that if there was no control for the operation of finger 133, the bell crank lever through the medium of the weight 147 would cause it to swing each time directly to the knot picker and, if there was a heavy layer of bristles upon the plate 131 it is obvious that these bristles would be jammed against the knot picker and would tend to pile up so that, with a few movements of the finger, the congestion of bristles adjacent the knot picker would be so great that the machine would be jammed and the bristles would be thrown about the machine. It is obvious, therefore, that the finger 133 must be controlled in relation to the amount of bristles being fed to provide for efficient and smooth operation of the machine.

In order to take care of this problem a lever 169 is pivotally mounted on a stationary part of the frame at one end and pivotally connected at its upper end as at 170 to a connecting link 171 which is in turn pivotally connected to a small lever 172 controlling the operation of the spring pressed dog 173. The movement of the lever 169 is controlled by the cam roller 174 operating in a groove on the rearward face of the cam 163 and according to the contour of the defining wall of the cam groove, the lever 169 is moved to the left or to the right to engage or disengage the dog 173 with the teeth 142 in rack 141. If there is a fairly heavy quantity of bristles on the plate 131 the finger 133 moved to the left by the bell crank lever 144 through the medium of the weight 147 will not move as rapidly as if there was a thin layer of bristles upon the plate. Consequently the cam 163 through said groove will cause the lever 169 to be operated to the left before the finger has nearly reached the knot picking unit C, and therefore the dog 173 will immediately engage with the teeth 142 of the rack 141 and stop the movement of the bell crank lever.

On the other hand in the case of a thinner or thin layer of bristles on the plate 131 the finger 133 will not have so much resistance and will thus move faster than in the case of a thick layer. It will therefore move substantially farther than the previous operation referred to, in the time it takes the cam to operate lever 169 to stop the movement of the bell crank lever 144 by engagement of the dog 173 with the teeth 142 of rack 141. It is apparent therefore that the finger 133 is controlled to feed bristles lying on the plate 131 to the knot picker so that in the case of a thin layer where less bristles are present, the finger will make a longer sweep, and consequently deliver a sufficient amount of bristles towards the knot picker uniformly to fill its receiving pocket whereas in the case of a thick layer of bristles on the plate, the finger will not sweep as far and while substantially the same quantity of bristles will be delivered to the receiving pocket of the knot picker there will be no jamming or congesting.

Furthermore, it will be realized that the bristles are fed to the plate in proportion to the movement of the finger 133 for the reason that if the finger sweeps forwardly its maximum distance the dog 118 controlled by lever 119 will move through a greater arc around ratchet wheel 117 and on the return movement of the finger 133 the ratchet wheel will be rotated to the maximum extent so that a greater quantity of bristles will be delivered to the bed plate 131. On the other hand, if in view of a thick layer of bristles upon the bed plate, the dog 173 is caused to engage with the rack 141 to limit the travel of the finger 133, then the dog 118 will travel around the ratchet wheel 117 through a shorter arc and upon the return movement of the finger the ratchet wheel will not be rotated to as great an extent so that less bristles will be fed to the bed plate. It is therefore obvious that bristles are fed to the bed plate in proportion to the amount of bristles moved toward the knot picker so that the feeding will be constant in regard to the capacity of the knot picker, and therefore it is impossible for the machine to become jammed by reason of too great a quantity of bristles being fed to the knot picker.

The knot picking unit

The knot picking unit C is in the form of a disc 174 which is designed to move through a predetermined arc to carry bristles from the bed plate 131 to a point registering with the ferrule transfer mechanism D. A bristle receiving pocket 175 is formed in the periphery of the knot picker of a size to correspond with the cross sectional area of the brush ferrule into which the knot of bristles is designed to be projected. To this end the pocket is adjustable to accommodate the various sizes of the brushes to be made. The knot picker disc 174 is normally positioned so that the lower side of the pocket registers with the face of the plate 131 and as the finger 133 sweeps the bristles along the plate 131 they will be swept directly into the pocket 175. The knot picker disc 174 is loosely mounted upon the shaft 176 and consequently will not rotate with the shaft 176 until it is positively linked therewith.

On the shaft 176 on one side of the disc 174 is keyed a quadrant arm 177 carrying a knife like guard 178 which is designed to overlie the periphery of the disc and is formed with a pointed end 179. The quadrant arm is also provided with an arcuate slot 180 through which project bolts 181 and 182 carried by the knot picker disc 174 and consequently upon rotation of the shaft 176 the quadrant arm 177 will move through an arcuate path while the disc 174 stays stationary until the bolt 182 comes in contact with the slot 180.

During the movement of the quadrant arm 177 before the bolt 182 contacts with the end of the slot 180 the guard 178 moves around the periphery of the disc 174 and its pointed end 179 pierces the group of bristles lying upon the bed plate and within the pocket 175 until the guard reaches the position shown in Fig. 11, the guard completely enclosing the open side of the pocket 175 and firmly retaining a uniform knot of bristles therewithin. Connected to the guard 178 and lying parallel with the disc 174 is a guide plate 183 which is formed with the projecting nose 184 and as clearly illustrated in Fig. 11, this nose will overlie one side of the knot of bristles held within the pocket of the knot picker disc, so that these bristles will be firmly gripped by the guard on the one side and the nose 184 on the other. This will tend to more firmly hold the bristles to prevent the ends of the bristles from spreading outwardly away from one another.

On each side of the pocket 175 on a stationary part of the frame are mounted spring pressed dogs 185 and 186 which press against the periphery of the disc 174 the lower dog 185 serving to prevent bristles from dropping between the disc and plate 131, while the upper dog 185 co-operates with the guard 178 so that when its point projects through the layer of bristles on the bed plate, to enclose a knot within the pocket 175, it will serve to hold any bristles not enclosed within the pocket from being pushed upwardly by the end of the guard and confine the remaining bristles strictly to the stock box. As the guard moves around the disc it will contact with these dogs which will move about their pivots to permit the guard to pass freely.

When a knot of bristles has been enclosed within the pocket 175 the guard is in a position shown in Fig. 11 at which point the bolt 182 is just contacting with the end of the slot 180. Consequently on further rotation of the shaft 176 the knot picker disc 174, loosely mounted on the shaft 176, will be caused to then move with the quadrant arm 177 so that the pocket 175 carrying a knot of bristles is moved through an arc to position the knot at a 90° angle to its normal position, as illustrated in Fig. 12, positioning the knot at a point directly above the shaft 176. To control this movement an arcuate slot 187 is formed in the disc and a bolt or stop rod 188 is designed to project thereinto, this bolt or stop rod being carried upon the yoke 189 carried on the shaft 176. The bolt or stop rod 188 is provided with friction washers 189a on each side, spring pressed by the coil spring 190 so that the movement of the disc will be a positive and gradual one corresponding with the movement of the quadrant arm 177 and this prevents the disc from a tendency to rotate or swing freely about the shaft in advance of the quadrant arm 177 once it has been urged forwardly thereby. When the disc has been rotated the end 191 of the slot 187 will finally come in contact with the bolt or stop 188 positively to position the knot carried in pocket 175 in the position illustrated in Fig. 12 at which point the bristles register with the preliminary position of a ferrule being fed through the machine by the ferrule transfer mechanism D.

The knot picker disc 174 is driven in synchronism with the bristle feeding unit and the guard 178 and disc 174 are rotated to the positions referred to by means of the cam 192 carried on the end of the shaft 29 adapted to reciprocate the rod 193 which at one end carries a roller 194 extending into a cam groove in the cam 192, while the other end connects with a crank 195 rigidly secured to shaft 176. Therefore as the connecting rod 153 is reciprocated through the cam groove, the guard 178 will be moved to a position closing the pocket in the knot picker disc, and the knot picker disc 174 will be rotated to its position carrying bristles to a point where they may be transferred to the ferrules positioned for their reception, and the disc and guard will be returned to their normal position, this action being intermittently continued throughout the operation of the machine.

*Ferrule feed and ferrule transfer mechanism*

The ferrules for the brush units are carried in the hopper or magazine 196 which is mounted on a raised portion of the framework normally forming a part of the support for the bristle feed and mechanism for the automatic feed control unit B, the magazine being provided with suitable facilities for adjusting the side walls so as to accommodate various sizes of ferrules. Ferrules are dropped from the magazine by gravity onto a conveyor 197 preferably in the form of an endless chain formed with the projecting fingers 198 designed to contact with each ferrule to carry them throughout the length of the feed chain. This chain operates between a stationary guide 199 and a movable guide 200 which may be moved relatively to the guide 199 to accommodate different lengths of ferrules. The conveyor 197 passes over the sprockets mounted on the stub shafts 201 and 202, the shaft 202 carrying the drive sprocket 130 which imparts motion to the conveyor 197 through the medium of the drive chain 128 from sprocket 115. The ferrules during operation are carried along by the conveyor 197 to the inclined slide or chute 203 (see Fig. 1) and delivered to a lower level by gravity to drop finally upon the reciprocable transfer bars 204 of the ferrule transfer mechanism D, see Fig. 1A.

The ferrule transfer mechanism D consists of the reciprocating transfer bars 204 (see Fig. 33) and the upper stationary guide bar 205, the bars 204 being in spaced apart parallel relation in a horizontal plane and being spaced apart vertically from the stationary guide bar 205 which lies in a plane parallel to transfer bars 204. The transfer bars 204 are designed to slide back and forth with the guides 206 which move over the rollers 207 carried in suitable channels 208 mounted on the upstanding supports 209 and 210 projecting above the bed of the machine. Between the transfer bars 204 are mounted the rollers 211 which readily slide over the stationary ferrule guide bar 212. The guide bar 212 is formed with a groove 213 throughout its length, while the stationary guide bar 205 is provided with a corresponding groove 214, see Fig. 41, the grooves 213 and 214 being in vertical alignment and designed jointly to receive one of the upstanding ribs which are formed on the ferrule so that these grooves form positive means for rigidly retaining the ferrule in a set axial position during its travel through the ferrule transfer mechanism.

The guide bar 205 is suspended from the channel beam 215 which runs longitudinally of the machine, being rigidly mounted on the supports 209 and 210 above the transfer mechanism. The guide bar 205 is preferably formed in longitudinally aligned sections each connected to the channel bar by means of rods 215ª spring-pressed by the coil springs 216. In this manner the guide bar 205 is yieldably supported from the channel beam 215 and, while the guide bar 205 co-operating with the guide bar 212 will serve firmly to hold the ferrules therebetween, the fact that the guide bar 205 is sectional and yieldably supported will compensate for any possible irregularities in the ferrules.

The transfer bars 204 are provided with a plurality of spring pressed dogs 216ª carried on suitable axles 217 upon which the springs 218 are wound, the arrangement of the axles being such that the outer surface of the springs will lie in a plane below the outer surface of the rollers 211. The springs 218 normally urge the ends of the dogs 216ª above the upper edges of the bars 204, see particularly Fig. 35, so that they will contact with one side of ferrules carried between the guide 212 and guide bar 205, and upon movement of the transfer bars 204 in one direction they will push the ferrules in the same direction along between the guide bars, a distance corresponding to the extent of movement of the bars 204. When the transfer bars are moved in the opposite direction the dogs 216ª will move past the ferrules following in the transfer mechanism, the dogs being depressed by these ferrules until they pass them to resume their normal projected position. Upon resuming their normal position the dogs will contact with the next ferrule and pass it along between the guide bar 212 and the upper guide bar 205, when the transfer bars 204 are again moved in the opposite direction.

The upper guide bar 205 is formed with a plurality of spaced apart pivoted dogs 219 which project downwardly by gravity beyond the lower edge of the guide bar 205, being stopped in this position by a suitable stop pin 219ª. Thus the dogs 219 always project below the guide bar 205 and as is apparent from Fig. 35, when the bars 204 after having pushed forward a ferrule through the medium of the dogs 216ª move back again in their reciprocating movement, the dogs 216ª pass under the ferrules, and will not move the ferrules along with them since the dogs 219 project directly in the path of the ferrules to hold them in the position to which the dogs 216ª have just delivered them. As the dogs 216ª pass the ferrule along between the guides 212 and upper guide bar 205 the dogs 219 will move upwardly as a ferrule contacts with them and will drop back to normal position to prevent a ferrule from passing backwardly between its guides. Thus through the medium of the dogs 216ª which are in uniform spaced apart relation throughout the length of the transfer rods 204, the ferrules will be moved along through the transfer mechanism a predetermined distance for each upward movement of the transfer rods 204, while the dogs 219 on the guide bar 205 will serve to retain them in this predetermined momentarily stationary position until the transfer bars 204 again advance them to the next predetermined position. The transfer bars 204 are reciprocated by suitable mechanism hereinafter referred to.

*Bristle transfer mechanism*

It is apparent from the action of the ferrule transfer mechanism that these ferrules will be moved through the machine in a series of intermittent steps in which each ferrule during its travel will remain momentarily stationary in a set position at points along the machine. During operation as a ferrule is moved to a momentarily stationary position registering with the pocket 175 carrying a knot of bristles, the bristles are transferred from the pocket 175 to this ferrule. This is accomplished by means of the jaws 220 and 221, see particularly Fig. 12, which are positioned one above the other, mounted on the arms 222 and 223, the arms being pivotally mounted at their opposite ends on the pivot pins 224 and 225 carried by the sliding carriage 226, see Fig. 2A. The arms are arranged so as to project the jaws on each side of the bristles carried in the pocket 175, when this pocket reaches its second position above the shaft 176, so that upon movement of the jaws towards one another they will firmly grip the projecting bristles therebetween. The arms 222 and 223 are normally urged toward one another by the spring 227 and held apart against the pressure of this spring by means of a cam 228 mounted on the end of the shaft 229 which passes through the carriage 226 and moves therewith. On the opposite end of shaft 229 a crank 230 is mounted and connected to one end of a connecting rod 231 by a universal connection, the other end of the rod 231 being connected through a universal connection with a cam roller adapted to ride in a cam track of the cam 192. The lever 231 is therefore oscillated by means of the cam 192 at the appropriate moment, to rotate shaft 229 and thus cause the cam surfaces of the cam 228 to move out of engagement with the arms 222 and 223 so that under pressure of the coil spring 227 the jaws 220 and 221 are caused to firmly grip therebetween the bristles projecting from the pocket 175 of the knot picker disc 174, the relative positions of the jaws at this point being illustrated in Fig. 12, just prior to the gripping of the bristles by the jaws.

When the bristles have been gripped by the jaws 220 and 221, the carriage 226, which includes the connected guides 232 and 233 engaging with the transverse guideway 234, is caused to move towards the front of the machine by means of the connecting rod 235 connected to the carriage at one end and to the crank 236 at the opposite end, which is reciprocated by the cam 237 mounted on the cam shaft 25. The forward movement of the carriage 226 coincides with the start of the return movement of the shaft 176, moving the guard 178 positioned over the pocket 175 of the knot picker disc 174, so that the bristles now clamped between the jaws 220 and 221 are free in the pocket 175 by reason of the withdrawal of the guard 178 and, move forwardly in the jaws with the carriage, up to the mouth of the ferrule waiting at that point in the ferrule transfer mechanism. At this point it is necessary forcefully to urge the bristles into the mouth of the ferrule and this is done by means of a rapidly vibrating patter, as particularly illustrated in Fig. 13.

Upon the channel bar 216 supports 239 are mounted, in which is journalled the patter operating shaft 240. This shaft is rapidly rotated by means of the pulley 241 and belt 242 which is driven from the pulley 243 mounted on the main drive shaft 12. At a point on this shaft in alignment with the shaft 176 and consequently in alignment with the centre of the knot picker and the jaws 220 and 221, is mounted a cam 244 which is designed to contact with a roller 245 carried on the end of the bent patter arm 246 pivotally mounted intermediate its length on the swinging arm 247 in turn swingably mounted upon the shaft 240, see also Fig. 2A. On the opposite end of the patter arm 246 is mounted a patter 248 which in normal inactive position, as shown in Fig. 13, is designed to lie above the knot picker disc and above and behind the jaws 220 and 221. Intermediate of its length the arm 247 is pivotally connected to the link 249 which is pivotally connected to the swinging lever 250 in turn rigidly mounted on the shaft 251.

The shaft 251 is journalled on the frame, running longitudinally thereof in front of and below the cam shaft 25 and by means of a crank arm 252 (see Fig. 2A) and connected roller 253 which operates in a cam groove 254 of the cam 237 mounted on and operated by the cam shaft 25, the swinging lever 250 is intermittently oscillated so that through the connecting rod 249 and swingable arm 247 the patter arm 246 is moved towards the ferrule transfer mechanism. The forward movement of the arm 246 occurs at the moment that the jaws 220 and 221 move forward with a knot of bristles to place them in the rearward end of the waiting ferrule so that the patter 248 is moved adjacent to the butt end of the bristles gripped in the jaws, at the time the jaws begin to release the bristles. Therefore in view of the contact between cam 244, which is constantly rotating, with roller 245 of the patter arm 246 the vibrating patter arm when moved into contact with the butt end of the bristles will drive them a distance into the ferrule. As the bristles are driven into the ferrule the jaws 220 and 221 are completely released therefrom. The cam 254 then operates to return the swingable arm 247 and attached patter arm 246 back to normal inactive position above the knot picker and behind the jaws, at the same time that the jaws are returned to normal position adjacent to the knot picker, to receive the next knot of bristles. Thus as the ferrules are passed along through their transfer mechanism and are stopped in front of the knot picker, the bristles carried in the knot picker are delivered thereto and firmly inserted partially within the ferrules. At this point the brush unit is approximately in the form illustrated in Fig 42 with one end of the bristles projecting from the rearward end of the ferrule.

The ferrules are carried on through the machine by the transfer mechanism from this point and further along the machine the bristles are patted again to project them further into the ferrule, by means of a patter 255 carried on patter arm 256 vibrating in a manner similar to patter 246 from a cam on shaft 240. The patter 255 is moved adjacent the butt end of the bristles by a swinging arm 257 pivotally connected to the connecting rod 258 which is operated by the swinging lever 259 through the medium of a roller engaging with a groove in the cam 260 (see particularly Fig. 13 and also Figs. 2A and 2B). The bristles then are set firmly within the ferrules at this point but still project from the rearward end thereof and, in this condition, the partially formed brush units are passed to the cardboard inserting unit E for inserting a wedge between sections of the bristles.

*Wedge forming and inserting unit*

As the bristles projecting from the rearward end of the ferrule pass adjacent to the unit E, the butt of the bristles comes in contact with the bristle dividing knife 261 of the unit E which is formed with the inclined knife edge 262 gradually merging into the straight wedge like section 263 (see Fig. 19) the outer edge of the wedge like section lying parallel with the ferrule transfer mechanism. When the butt of the bristles comes in contact with the bristle dividing knife, in view of the fact that it registers with the ferrule transfer mechanism in such a manner to lie in an axial plane midway between the upper and lower surface of the ferrules, the knife will gradually split the butt end of the bristles into two equal upper and lower sections, and as the ferrule transfer mechanism moves each brush unit along, the wedge like section 263 of the bristle dividing knife increases the space formed between each section of bristles so that as they pass off the end of the wedge section of the bristle dividing knife the upper and lower sections of the bristles are spaced apart to a fair degree.

In the end of the bristle dividing knife is formed a groove 264 which runs transversely of the knife the groove being designed to overlie the central passageway 265 formed in the unit E through which the cardboard strip or strips 266, which are to form wedges, are passed, see Figs. 16 and 17, so that as the cardboard is projected from the front of this unit one edge of the cardboard will enter the groove 264 and, in effect the width of the cardboard strip or strips 266 forms a continuation of wedge-like sections of the bristle dividing knife 261. Therefore as the bristles pass from the knife 261 the upper and lower sections into which the bristles have been divided are still defined by the end of the cardboard strip or strips 266 so that upon cutting the cardboard strips the butt end of the bristles will be left with a cardboard wedge arranged between their divided upper and lower sections.

The wedge may be formed of one ply or a plurality of plies of cardboard according to the size of the brush being manufactured. If a plurality of plies of cardboard is used they are formed from one thick laminated strip of cardboard, each ply being arranged to lie one upon the other. For instance, upon referring to Fig. 3, it will be noted that the cardboard is carried on a plurality of reels 267 mounted on suitable connecting brackets 268 which may be adjustably secured upon the supporting standard 269 and each strip of cardboard from a reel is passed over rollers 270 which lie one above the other so that the strips as fed into the machine will lie one above the other. These strips of cardboard or one strip of cardboard, if only one is used, are passed to unit E as indicated clearly in Figs. 17 and 18 passing over the guide plate 271, over which lies the tension roller 272, to enter into the central passageway 265 and finally pass over the ejecting roller 273. Above the ejecting roller 273 lies the tension roller 274, see Fig. 16, the tension roller being rotatably mounted on a carriage 275 which normally urges the roller 274 towards roller 273 by means of coil springs 276, the carriage being provided with the shank 277 projected upwardly through the framework to function in raising or lowering the roller by means of the operating lever 278, the coil spring 279 extending around the shank 277 operating further to urge the carriage 275 and roller 274 towards the ejecting roller 273.

The roller 273 is mounted upon spindle 280, see Figs. 14 and 15, and also secured to this spindle preferably on the outside of the framework of the unit E is a ratchet wheel 281. Loosely mounted on the spindle is an arm 282 which carries the spring pressed pawl 283 designed to engage with the teeth of the ratchet wheel 281 to rotate the wheel in a clockwise direction while, upon the frame of the unit E, above this wheel is mounted the dog 284 which engages with the teeth of the ratchet wheel 281 to prevent it moving in a counter-clockwise direction. Pivotally attached to the arm 282 is a connecting rod 285 which is connected at its opposite end to one arm of the double-armed lever 286, the lever being swingably mounted as at 287 on the frame of the machine and carrying the cam roller 288 on its opposite arm designed to engage with a cam 289 formed on the cam wheel 290. The cam wheel 290 is rotated through the medium of cam shaft 25, and a coil spring 291 extending between the frame of the unit E and one arm of the lever 286 normally urges the roller 288 into engagement with the cam 289. Thus as the cam wheel 290 rotates, when the roller 288 moves into the depression 292 formed in the surface of the cam, the rod 285 will move forwardly and its pawl 283 will slide over the teeth of the ratchet. When, however, the roller starts to move out of the depression 292 the ratchet wheel 281 will be gradually rotated in a clockwise direction until the ejecting roller 273 has ejected a portion of the strip or strips of cardboard through the central passageway 265 to project outwardly from the unit E in which position the end of the strip 266 lies in a position shown in Fig. 16, one edge protruding within the groove 264 in the bristle dividing knife 261. The rod 285 will then remain stationary, while the roller 288 travels around the uniform portion of the cam.

When the end of the cardboard strip 266 has been projected forwardly of the unit E and lies between the upper and lower sections into which the butt end of the bristles has been divided, the cutting knife 293 which is vertically slidable on the frame of the unit E in the guides 294, is operated upwardly to shear off the end of the cardboard and thus leave a cardboard wedge of predetermined size between the sections of the bristles. The knife 293 is connected to a double armed lever 295 (see Fig. 14) which is pivoted on the unit E as at 296, the knife being pivotally connected with one arm of the lever by means of the adjustable connection 297 so that the length of the stroke of the knife may be adjusted according to whether one strip or a plurality of strips of cardboard are being used.

The second arm of the lever 295 is pivotally connected to the connecting rod 298, the opposite end of which is pivotally connected to a lever 299 carrying on its free end the cam roller 300 designed to travel in the cam groove 301 formed in the opposite side of the cam wheel 290 and, as the roller 300 moves into the offset portion 302 of the cam track 301, while the roller 288 is riding around the uniform portion of cam 289, the rod 298 will be pulled rearwardly thus to operate lever 295 which will move the knife 293 upwardly to shear off the projecting cardboard at that moment lying stationary in its projected position. The brush unit at this point is formed substantially as illustrated in Fig. 43. Following the shearing of the end of the cardboard, the roller 288 will then pass through depression 292 in cam 289 to again cause the end of the cardboard to be projected beyond the front of the unit E.

Prior to the passage of the butt end of the bristles over the dividing knife 261, the bristles projecting from the rearward end of the ferrule are first reinforced so that in their contact with the knife they will not tend to laterally displace or abnormally spread. This reinforcement consists in traversing the knot of bristles with the teeth 302 (see Figs. 21 and 22) of a comb 303 formed with the projecting shank 304 which is secured by means of the pin 305 to the head piece 306 of a plunger rod 307 slidably mounted in the bracket 308 which is rigidly secured to the outside bar of the reciprocable transfer bars 204 as particularly illustrated in Fig. 21. The lower surface of the shank 304 lies upon the base of the lower defining wall of the recess 309 formed in the head piece 306, the pin 305 being of such a length that the position of the comb may be laterally adjusted if necessary, the spring 310 extending between the end of the shank and an anchoring point on the head piece 306 serving to supplement the mounting of the shank to firmly seat it and avoid chatter.

The bracket, as noted in Fig. 20, is curved from the outer transfer bar to extend thereunder and the plunger rod 307 is reciprocably mounted in the bracket through the guides 311 and 311ª, the end of the plunger rod having secured thereto a block 312 which rigidly carries the vertical pin 313 passing through a corresponding orifice in a lateral extension of guide 311, to constitute a stabilizer and guide member for the rod and avoiding rotary movement thereof.

Rigidly secured upon the plunger rod 307, between the guides 311 and 311ª, are block members 314 which are formed with facing cup shaped depressions in which the rounded or ball shaped end 315 of an actuating lever 316 is designed to extend. The actuating lever is pivoted on the suspension bracket 317 rigidly fastened to the inner reciprocating transfer bar 204, a coil spring 318 extending between the lever 316 and the bracket 308 (Fig. 21) normally to urge the lever downwardly.

From a stationary part of the frame by means of the bracket 319, see particularly Figs. 20 and 22, is mounted a movable guide member 320, the guide member being pivoted at its inner end as at 321 to the bracket 319 and provided at its other end with a sloped projecting track 322. This end of the guide member is also provided with a stop pin 323 which is spaced from the pivotal mounting 321 and designed to bear against the upper surface of the bracket 319 so that the guide member 320 is always held in a set horizontal position and while it can be moved upwardly about its pivotal point it cannot move downwardly from the horizontal. In this horizontal position it constitutes a rigid guideway or track.

Upon the inner face of the lever 316 is provided a projecting roller 324 which is designed to extend over or under the outer edge of the guide member 320. Therefore, as the transfer bars 204 move toward the rearward end of the machine during operation the roller 324 will travel up the inclined track 322 and along the upper surface or guideway of member 320 which will swing the lever 316 upwardly, about its pivotal mounting. Due to the connection of this lever between the blocks 314, the plunger 307 will be caused to move upwardly a corresponding distance and, through the medium of the shank 304 of the comb 303 which moves with the plunger rod 307, the teeth of the comb will be passed through the butt end of the bristles projecting from a ferrule carried by the transfer bars, the teeth entering the bristles just before these bristles come in contact with the dividing knife 261. Furthermore, the teeth of the comb will be held in this position, extending through the bristles, for a period of time corresponding to the travel of the roller 324 upon the guideway or upper surface of member 320, which will correspond to the travel of the butt end of the bristles over the dividing knife until they have been separated into sections and positioned before the cardboard insert. At this point the roller 324 moves to the end of the guideway of member 320 and, due to the force of the coil spring 318, the lever 316 with attached roller 324 and plunger rod 307 will be pulled downwardly, and on the rearward movement of the reciprocating bars 204 the roller 324 will pass beneath the guide member 320, as illustrated in Fig. 23, in which various positions of the roller are shown in dotted lines. When the transfer bars 204 approach the final portion of their travel in that direction the roller will contact with the underside of the track 322 and will move it upwardly about its pivotal point as illustrated in Fig. 23 so that after the roller has passed the track 322 the guide member will drop to its normal position as governed by the pin 323 and upon the next forward movement of the transfer bars the roller will again move along the guideway to cause the comb teeth to be inserted in the butt end of the bristles of the next brush unit. It is apparent therefore that the butt end of the bristles will be held in their relative positions and therefore reinforced as they pass to the dividing knife 261. Consequently the possibility of the bristles being displaced or distorted during this part of the operation is completely obviated.

During the time that the wedge is being inserted and cut off between the separated bristles of any brush unit the brush unit being acted upon lies stationary as the reciprocating transfer bars 204 move rearwardly, being held by one of the dogs 219ª as well as the grooves 213 and 214 in guide bars 205 and 212. After the wedge is inserted and cut off the brush unit is carried along by the transfer mechanism to the next position where it pauses or lies momentarily stationary, at which point it is in register with the patter 325 of a construction similar to the patters 248 and 255 and mounted in a similar manner, being constantly vibrated by a cam on the shaft 240 and swung into and out of engagement with the brush units by the connecting rod 326 operated by cam 327 on shaft 25 in synchronism with the movement of the brush units. This patter is arranged so that it will contact with the butt end of the bristles more forcefully than the previous patters and as it contacts with the butt end of the bristles during its vibration it drives the bristles and carried wedge completely into the ferrule so that the butt end is flush with the rearward end of the ferrules as illustrated in Fig. 44. The ferrule transfer mechanism then carries each brush unit so acted upon to the trimming unit F.

Bristle trimming unit

After the bristles have been acted upon by the patter 325 to project them further into the ferrules with the butt end flush with the rearward end of the ferrules, there may be a few bristles projecting from the rearward end of the ferrules. In order to take care of this, therefore, the rearward end of the ferrules is caused to pass by the trimming unit F, which may be of any desired form such as a singeing device or clipping mechanism, but preferably the former. Both forms of trimming device have proven satisfactory but the singeing device is alone shown in the drawings.

Upon referring to Figs. 25 to 27, it will be seen that the singeing device is mounted upon the standard 328 rigidly secured by supports 329 from the main frame of the machine and by means of the adjustable supports 330 and 331. The bracket 332 or the singeing device may be vertically adjusted according to the adjustment of the transfer mechanism to suit the size of the brush being made. A suitable transformer or other device 333 for supplying the requisite voltage and amperage may be mounted on the bracket 322 connected by the leads 334 to the terminals 335 to the resistance element 336, which is preferably secured within the bolts forming the terminals 335 (see Fig. 27), the resistance element extending in a vertical plane and being positioned on the bracket so that it will project parallel with and practically touch the rearward end of the ferrules as they pass thereby. Consequently any bristles projecting from the rearward end of the ferrule will be trimmed off by the resistance element 336 so that the bristles will only project from the forward end of the ferrule. A suitable fume pipe 337 (see Fig. 1A) may be positioned over the singeing unit to carry away the fumes given off when the projecting bristles are burnt by the resistance element.

*Final setting of the bristles*

The bristles, while inserted within the ferrules at this point so that they only project from the forward end, must be moved within the ferrule to normal position so that the butt end carrying the wedge is positioned within the ferrule towards the forward end thereof, leaving a sufficient space between the butt of the bristles and the rearward end of the ferrule to carry the cement for firmly setting the bristles and leaving room for the tenon of the handle, which is fitted into the ferrule to complete the brush. Therefore, as soon as each brush unit has passed the singeing apparatus, the ferrule transfer mechanism positions each brush unit in register with the final pulling mechanism G.

This mechanism is particularly illustrated in Figs. 28 to 30 and consists in a pair of jaws 338 and 339 positioned on the outside of the ferrule transfer mechanism so as to extend on each side of the bristles projecting from the forward end of the ferrule. The jaw 338 is rigidly carried by the slide 339 which normally projects through the channel bar 215 and is designed to slide between the pairs of rollers 340 and 341, one of the pair of rollers 340 being mounted on the channel bar 238 and the other being mounted upon the framework 341 of the final pulling unit G. The lower jaw 339 is resiliently mounted upon the slide 342 by means of the shank 343 and the coil spring 344, the slide 342 being pivotally connected as at 345 to bracket connected to the slide 339ᵃ. Also connected to these slides by means of the pivotal connection 345 is the operating rod 346, in turn connected to the lever 347 which is rigidly connected to the stub shaft 348. The stub shaft 348 is designed to be rocked by the cam lever 349 which is provided with a roller extending into the cam track 350 of cam 351. The rod 346 is connected to the lever 347 by means of the screw threaded shaft 352 so that upon rotating the operating member 353 the position of the end of the rod 346 may be adjusted longitudinally of the lever 347 to vary to a degree the throw of the rod 346.

Normally the jaws 338 and 339 are separated to permit the projecting ends of the bristles to pass therethrough. However, when the bristles of a brush unit have come to a position where they project between the jaws 338 and 339 the jaws are moved relatively to grip them. This is accomplished by means of the lever 354 carrying on one end the roller 355 which is designed to bear against the bottom surface of the slide 342. The lever 354 is keyed to the shaft 356 which is designed to be rotated by the lever 357 keyed thereon. A connecting rod 358 is pivotally secured to the free end of the lever 357 and pivotally secured to the cam lever 359, which is pivoted to the frame of the machine and provided with a roller extending into a cam groove in the opposite side of the cam 351, see particularly Figs. 28 and 29. The cam grooves in the cam 351 are therefore arranged so that prior to the forward movement of the connecting rod 346, the lever 359 will be moved forwardly to operate the lever 354 through its connecting rod 358 and associated connections to bring the roller 355 into contact with the lower surface of the slide 342 and therefore cause the slide to move upwardly, swinging about the pivotal point 345 until the jaw 339 firmly presses the projecting bristles between it and the stationary jaw 338. When this has been accomplished the cam track 350 then causes the lever 347 to move forwardly and, through the connecting rod 346, causes the slides 339ᵃ and 342 to move forwardly. The bristles gripped between jaws 338 and 339, therefore, are pulled forwardly in the ferrule to set them in their normal position ready to receive the rubber cement. When they have been pulled forwardly to the desired extent, through the medium of the cam 351, the jaws are caused to disengage and the slides 339ᵃ and 342 are returned to their normal stationary position. At this point the brush units are formed as illustrated in Fig. 45.

*Final combing*

The ferrule transfer mechanism passes each brush unit from the final pulling mechanism G to final combing mechanism H. At this point the spring pressed dogs 216 on the transfer bars 204 terminate and the dogs 219 also terminate, so that each brush unit as it is delivered to a position registering with the final combing mechanism is moved past the combing mechanism through the medium of the next brush unit delivered by the end dogs of the ferrule transfer mechanism. Prior to ejection of the brush units from the machine the brush units lie side by side as illustrated in Fig. 1A. As a result the combing mechanism H will comb each brush unit as it passes between the combs and will also act upon bristles of the adjacent brush already acted upon, until it passes beyond the comb teeth. The bristles will therefore receive a thorough combing.

The final combing unit H consists in swinging lever 360 which is pivoted at its lower end as at 361 and, at its upper end, carries the opposed combs 362, through the medium of the opposed pivoted arms 363 and 364. The arms, as illustrated in Fig. 31 are pivotally mounted on the lever 360 one above the other, the arm 363 being provided with the forked projection 365 and the arm 364 being provided with a projection 366 provided with a pin 367 which extends between the forks of the projection 365. Consequently upon movement of the arm 363 the forked projection will bear against the pin 367 and cause arm 364 to make a corresponding movement. The coil spring 368 extends between the arms 363 and 364 to normally urge them towards one another, and by means of the projection 369 on arm 363, the arm is pivotally connected to an operating link 370. The operating link is in turn connected to the bell crank lever 371 which is connected to the rod 372, operated by the double armed cam lever 373 pivotally mounted on a bracket of the frame as at 374 and provided with the roller 375 operating in cam groove 376 of cam 377. On operation of this cam the groove 376 will cause relative movement of the lever 373 to intermittently move the arms 363 and 364.

In Fig. 31 the combs are illustrated as just entering the bristles of a brush unit and they will remain in this position as the roller 375 passes through the uniform portion of the cam groove. During this position of the combs the connecting rod 378 pivotally connected as at 379 to the lever 360 will cause this lever to swing outwardly by means of the cam lever 380 provided with a roller projecting into the cam groove 381 formed in the opposite side of the cam 377. Thus, as the teeth 362 are moved into the bristles, the lever 360 moves outwardly to draw the combs completely through the bristles. When the lever 360 has reached its maximum outward position, at which time the combs have passed completely through the bristles, the jaws will be moved apart by means of the cam track 376, as previously referred to, and the cam groove 377 through the lever 380 and associated connections will draw the lever 360 back to its inner position, at which point the combs will be moved towards each other to enter the bristles again. Upon this operation being completed, the brush units are completed with the bristles in uniform order ready for cementing and the following operation of inserting the handles, which is taken care of by a further machine not dealt with herein. Each brush unit, therefore, after it has passed through the final combing is moved along through the machine by the succeeding brush unit until it is moved from between the guide bars 205 and 212 to pass over the guide plate 382, from which it will drop through the discharge guideway 383 to be deflected on to the conveyor 384.

The transfer bars 204 are constantly reciprocated through the operation of the machine by means of the lever 385, which is pivoted to the connecting link 386, in turn pivotally connected to the bars 204, and swings about its pivotal mounting 387 by motion of the connecting rod 388, one end of which is pivotally connected to lever 385 and the other is operated by a crank 389 formed on one end of the shaft 22 of the reducing unit 21, the lever 385 lying adjacent the guideway 383.

The endless conveyor 384 extends longitudinally of the machine frame and forwardly thereof, as illustrated in Figs. 1 and 1A. This conveyor will then convey the brush units to another point along the framework of the machine where a suitable receptacle may be positioned to receive them. The conveyor extends over the pulley 390 carried in the adjacent bracket 391 on the rearward end of the machine and, at the other end, extends over the pulley 392 on the shaft 393. The conveyor may be driven either from the shaft 393 or from a shaft upon which the pulley 390 may be mounted. In the latter case this shaft would be driven from the reducing unit 21. In the former case the conveyor is driven from the shaft 393 through suitable driving connection with the reducing unit 26 or the main drive shaft.

*Adjustment of ferrule transfer mechanism*

To arrange for vertical and lateral adjustment of the ferrule transfer mechanism so as to accommodate different sized ferrules in the manufacture of different size brushes, the channels 208 carrying the transfer bars 204 are mounted on the vertically movable standards 394, which are slidable within the upstanding supports 209 and 210, the standards 394 being bored and screw threaded to receive the screw actuators 395 which are rotatably mounted in the base of the supports 209 and 210. The actuators 395 carry the worm wheels 396 designed to mesh with the worms 397 carried on the horizontal shaft 398, which extends within the supports 209 and 210, see particularly Fig. 33 and also Fig. 1A. The shaft 398 is provided with a hand wheel 399 and upon rotation of this hand wheel in one direction or the other the worms will cause rotation of the worm wheels 396 and thus rotate the screw actuators 395 to raise or lower the reciprocable bars 204 of the transfer mechanism, in addition to spacing the guide bar 212 from guide bar 205. Therefore, ferrules of different thickness are readily accommodated.

At the base of the supports 209 and 210 respectively, transverse shafts 400 and 401 are journalled in the frame and provided with the hand wheels 402, the shafts extending beyond the supports suitably journalled and, by means of the sprocket 403 on shaft 400 and sprocket 404 on shaft 401, which are interconnected by the sprocket chain 405, upon rotation of either of the hand wheels 402, both shafts 400 and 401 will be caused to rotate in a similar direction regardless of which way the hand wheel is rotated. The bases of the supports 209 and 210 are formed in a slide 406 (see Fig. 34), each of which is designed to slide horizontally in guideways formed by the guide plates 407. The bases of the supports 209 and 210 are provided further with a screw threaded sleeve 408 or similar device, which is adapted to cooperate with the screw threading on the shafts 400 and 401 so that, as they are rotated, the supports 209 and 210 may be moved in either direction transversely of the machine, thus carrying the transfer mechanism closer or farther away from the other mechanism acting upon the bristles, to accommodate the various sized ferrules as required.

*General operation*

Assuming that the supports 209 and 210 have been adjusted so as to move the transfer mechanism into the proper position to accommodate the size of the ferrule being acted upon, the machine is set in motion by connecting the motor and drive shaft 12 in driving engagement when the various parts of the mechanism commence to function. The bristles are placed by the operator to lie upon the feed chains 30 and 31 after they have been preliminarily evened by means of the vibrator 34. Feed chains 30 and 31 then carry the bristles through to the preliminary combing mechanism, the bristles being uniformly arranged on the chains before reaching the combing mechanism and, after passing from the combing mechanism, by means of the vibrator 49 and patter 52 and vibrator 94 and patter 93, which extend substantially throughout the length of the feed chains to agitate the bristles throughout their passage to the knot picking apparatus. As the bristles reach the preliminary combing apparatus they are firmly clamped between the feed chain 31 and the endless chain 69, which forms part of the preliminary combing apparatus and lies above the feed chain 31, the weight 72, through the medium of the cross link 68 serving to hold the chain 69 in firm pressure engagement with the bristles. The comb 81, constantly in motion through a driving connection with the main drive shaft 12, as previously explained, dips downwardly into the projecting bristles as they pass over the sprocket 61 gripped between chains 31 and 69, and serves to straighten out any bristles which may be tangled or out of uniform line.

After they have passed the preliminary combing mechanism during their travel towards the knot picking unit C, they are firmly held against general displacement on the chains 30 and 31 by means of cable 88 and positively held in their uniform arrangement on the conveyor chains through the guide chains 123 and 124, passing from between these chains and conveyor chains 30 and 31 to be delivered on to the bed plate 131 of stock box K, above which the feeding finger 133 is designed to oscillate.

When delivered on to plate 131 the feeding finger moves the bristles towards the knot picker C in bunches or groups. After each forward feeding motion of the finger 133, which forms part of the feed control mechanism B, is caused to rise by means of the lifting arm 165, which rises at an appropriate moment by means of the roller 168 operating in a cam groove in the main cam 163, thus raising the beam 136 and the finger 133. By means of the lever 157, which is operated by the cam 163, the lever 144 is caused to swing towards the right hand end of the machine after a forward feeding movement of the finger 133, thus swinging the finger 133 back a distance corresponding to the movement of lever 157. At the same time the lever 157 causes the operating lever 149 to swing to the right, which rotates the ratchet wheel 117 through an arc corresponding to the swing of the lever 149 to move the feed chains 30 and 31 and thus feed to the plate 131 a quantity of bristles corresponding to the extent or movement of ratchet wheel 117. At this point, when the finger 133 is swung backwardly towards the right to its maximum distance, the cam 163 permits the lifting arm 165 to drop, thus dropping the finger into the bristles on the plate 131. The weight 147 causes the lever 144 to swing back to the left, causing arm 133 to sweep the bristles before it towards the knot picker at a maximum speed or a slower speed, according to the amount of bristles before it. If a great number of bristles are before it, the finger will move more slowly and will be caused to stop its movement to the left, before it reaches a point adjacent to the knot picker, by reason of the cam 163 operating lever 169 towards the right to engage dog 173 with the teeth of the rack 141, stopping finger 133 before that point. Consequently the lever 144 will only travel a limited distance to the left, and similarly the lever 149 will travel to this corresponding limited extent, so that the pawl 118 will only travel around the ratchet wheel 117 to a limited extent. Therefore, when the finger is lifted by the lifting arm 165 and is moved back to its maximum extent towards the right, through the cam 163 and lever 157, the ratchet wheel 117 will only be rotated to a limited extent and less bristles will be fed to the plate 131.

On the other hand, when a minimum amount of bristles are before the finger 133, it will be swept faster and through a greater distance, to a point adjacent the knot picker, and the pawl 118 will travel around the ratchet wheel to a greater extent so that more bristles will be fed to the plate 131. Thus the feeding of the bristles to the knot picker is directly regulated regardless of whether a thick or thin layer of bristles is being fed by the feed chains 30 and 31.

The bristles are received by the knot picker disc 174 in the pocket 175 and, when this has been filled, the connecting rod 193 (see Fig. 2A), through the cam 192, rotates the shaft 176 to move the quadrant arm 177 a distance corresponding to the distance between the slot 180 and bolt 182. The knife-like guard 178 moves over the pocket 175 to hold the bristles within the pocket, at which time contact between the end of the slot 180 with the bolt 182 causes the disc to rotate until it positions the pocket carrying the bristles vertically above the shaft 176 and places the projecting bristles between the jaws 220 and 221 of arms 222 and 223, see Fig. 12. During this time the conveyor unit J through chain 197 is feeding ferrules from the magazine 196 to deposit them successively upon the reciprocating bars 204 of the transfer mechanism D, and the dogs 216ᵃ move the ferrules a predetermined distance according to the spacing of the dogs and the extent of movement of the bars 204 in one direction, whereupon the dogs 219 hold them in that momentarily stationary position. In this position, before being passed on through the machine, each ferrule registers with the pocket 175 in the knot picker disc 174 when it is moved, carrying bristles, to a position directly above the shaft 176.

When the knot picker disc 174 carries a knot of bristles in its pocket 175 to a position above the shaft 176, the jaws 220 and 221 are caused to grip the projecting knot of bristles, and the sliding carriage 226 is moved along the guideway 234 so that the jaws carry the bristles to the momentarily stationary registering ferrule in the transfer mechanism D. At this point the patter 248, which follows the moving jaws, moves adjacent to the butt end of the bristles gripped in the jaws and forcefully drives the bristles part way into the ferrule as the jaws release the bristles. The ferrule transfer mechanism D then carries the partially formed brush unit (bristles and ferrule, see Fig. 42) to the unit E, the projecting bristles being patted further into the ferrule during their travel to this unit, and prior to passing into contact with the bristle dividing knife 261 on unit E, the butt end of the bristles projecting from the rearward end of the ferrule is reinforced by the teeth 302 of comb 303, which traverse the projecting bristles so that they will not be distorted and displaced as they pass over the knife 261. As they pass over knife 261 the projecting butt end of the bristles is divided into two spaced apart sections, between which a cardboard wedge is inserted from unit E fed from the reels 267 through unit E and projected therefrom by means of the ejecting roller 273, the wedge formed by the projecting strip of cardboard being cut off to lie between the bristles (see Fig. 43) by means of the knife 293 operated in synchronism with the other mechanism by means of the double armed lever 295 through cam 290.

At this point the transfer mechanism D carries the brush unit with the inserted wedge along through the machine, and after passing from this unit the butt end of the bristles projecting from the rearward end of the ferrule carrying the wedge is brought into contact with the patter 325, which forcefully drives the projecting end of the bristles into the ferrule, so that it lies flush with the rearward end of the ferrule. As the brush unit passes on through the machine in the transfer unit D any bristles which may project from the rearward end of the ferrule are trimmed off by the trimming unit F, the rearward end of the ferrule passing close to the resistance element of singeing apparatus, if the trimming unit is in the form of a singer, or close to the knives of a clipper, if a clipper is employed, so that the stray projecting bristles are completely eliminated.

The transfer unit then carries the brush unit so formed (Fig. 44) to the final pulling apparatus G, the jaws of which, 338 and 339, are caused to grip the bristles projecting from the forward end of the ferrule, whereupon the jaws are moved outwardly through the medium of cam 351 and associated connections to draw the bristles and inserted wedge a distance through the ferrule to set the bristles in their final position, as shown in Fig. 45, the butt end of the bristles being spaced from the rearward end of the ferrule so as to provide room for the insertion of the tenon of the handle through the rearward end of the ferrule, which is accomplished through a further machine. From the final pulling unit G the transfer mechanism carries the brush unit to a point registering with the final combing unit H, at which point the brush units are passed along through the machine by contact with one another, and as the brush units pass between the combs 362, the combs are moved towards each other as previously described, so that the teeth enter between the bristles, and at this point the combs are moved outwardly to draw the teeth cleanly through the bristles. This action continues intermittently upon a number of brush units lying side by side until they pass beyond the combs, being fully completed and ready for final setting within the ferrules by cement and the insertion of handles. The completed brush units therefore discharge from the plate 382 and guideway 383 on to the endless conveyor 384, from which they are received in any suitable receptacle.

Various modifications may be made in the invention without departing from the spirit thereof or the scope of the claims and, therefore, the exact forms shown are to be taken as illustrative only and not in a limiting sense, and I desire that only such limitations shall be placed thereon as are imposed by the prior art or are specifically set forth in the appended claims.

What we claim as our invention is:—

1. A brush machine comprising means for feeding bristles into said machine, means for preliminarily combing said bristles, means for segregating the bristles into knots of uniform size, means for inserting said knots into ferrules, means for inserting a wedge between sections of said knots, and means for moving said bristles and carried wedge partially through said ferrules to form a complete brush unit.

2. A brush machine comprising means for feeding bristles into said machine, means for agitating said bristles during feeding to uniformly arrange them, means for preliminarily combing said bristles, means for segregating the bristles into knots of uniform size, means for inserting said knots into ferrules, means for inserting a wedge between sections of said knots, and means for moving said bristles and carried wedge partially through said ferrules to form a complete brush unit.

3. A brush making machine comprising means for feeding bristles into said machine, means for preliminarily combing said bristles, means for segregating the bristles into knots, means for inserting said knots into ferrules, means for separating one end of said knots while in said ferrules into sections, means for inserting a wedge between said sections, and means for moving said bristles partially through said ferrules to form a complete brush unit.

4. A brush making machine comprising means for feeding bristles into said machine, means for agitating said bristles during feeding to uniformly arrange them, means for holding said bristles during feeding against abnormal displacement, means for segregating said bristles into knots, means for inserting said knots into ferrules, means for inserting a wedge between sections of said knots, and means for moving said bristles and carried wedge partially through said ferrules to form a complete brush unit.

5. The machine as claimed in claim 4, in which means is provided for positively holding the bristles in their arranged position prior to segregating the bristles into knots.

6. A brush making machine comprising means for feeding bristles into said machine, means for preliminarily combing said bristles, means for segregating said bristles into knots of uniform size, means for inserting said knots into ferrules, means for inserting a wedge between sections of said knots, means for forcing said knots further into said ferrules to move the butt end of said knots flush with the rear end of the ferrules, means for trimming off bristles projecting from the rearward end of the ferrules, means for moving said bristles and carried wedge further through said ferrules to form a complete brush unit, and means for finally combing the bristles projecting from said ferrules.

7. A brush making machine comprising means for feeding bristles into said machine, means for arranging said bristles in uniform order during feeding, means for segregating said bristles into knots, means for inserting said knots into ferrules, means for inserting a wedge between sections of said knots, and means for moving said bristles and carried wedge partially through said ferrules to form a complete brush unit.

8. A brush making machine comprising means for feeding bristles into said machine, means for arranging said bristles in uniform order during feeding, means for segregating said bristles into knots, means for inserting said knots into ferrules, means for separating one end of said knots into sections, means for inserting a wedge between said separating sections, and means for moving said bristles and carried wedge partially through said ferrules to form a brush unit.

9. A brush making machine comprising bristle conveying apparatus, means for uniformly arranging the bristles on said conveying apparatus during operation, a control unit, means in connection with said control unit for intermittently operating said conveying apparatus, a knot-forming unit, means in connection with said control unit for feeding groups of bristles to the knot-forming unit, a ferrule magazine, means for feeding ferrules from said magazine into the machine, means co-operating with said knot-forming unit for intermittently removing knots of bristles therefrom and inserting them in said ferrules to form brush units, means for inserting a wedge between the bristles of each brush unit, and means for setting the bristles and wedges firmly within said ferrules.

10. A brush making machine comprising bristle conveying apparatus, means for uniformly arranging the bristles on said conveying apparatus during operation, a control unit, means in connection with said control unit for intermittently operating said conveying apparatus, a bristle receiving bed receiving bristles from said conveying apparatus, a bristle feeding finger, means for reciprocating said finger to feed said bristles from said bed to a knot forming unit, means in connection with said control unit for controlling the movement of said finger to constantly feed the knot forming unit without congestion, a ferrule magazine, means for feeding ferrules from said magazine into the machine, means cooperating with said knot forming unit for intermittently removing knots of bristles therefrom and inserting them in said ferrule to form brush units, means for inserting a wedge between the bristles of each brush unit and means for setting the bristles and wedges firmly within the ferrules.

11. A brush making machine comprising bristle conveying apparatus, means for uniformly arranging the bristles on said conveying apparatus during operation, means for holding said bristles during feeding against abnormal displacement, a bristle receiving bed receiving bristles from said conveying apparatus, a control unit, means in connection with said control unit for operating said conveying apparatus, a knot forming unit, a bristle feeding finger, means for reciprocating said finger to feed bristles from said bed to the knot forming unit, means in connection with said control unit for controlling the movement of said finger to constantly feed bristles to the knot forming unit without congesting the machine, a ferrule magazine, means for feeding ferrules from the magazine into the machine, means for passing said ferrules through the machine in a series of steps, means cooperating with said knot forming unit for intermittently removing knots of bristles therefrom and inserting them in said ferrules to form brush units, means for intermittently inserting a wedge between the bristles of each unit as they pass through the machine and means for setting the bristles and wedges firmly within said ferrules.

12. A device as claimed in claim 11 in which means is provided for trimming off bristles abnormally projecting from said ferrules.

13. A brush making machine comprising bristle conveying apparatus, a control unit, a knot forming unit, means in connection with the control unit for operating said conveying apparatus, means in connection with the control unit for segregating the bristles into groups and feeding them to the knot forming apparatus, a ferrule magazine, means for feeding ferrules from said magazine into the machine, means for carrying said ferrules through the machine, means cooperating with said knot forming apparatus for transferring the knots to said ferrules and means for firmly setting said knots within said ferrules.

14. A brush making machine comprising bristle conveying apparatus, a knot forming unit, means for feeding groups of bristles from said conveying apparatus to the knot forming unit, a ferrule magazine, a ferrule transfer unit, means for feeding ferrules from said magazine to said transfer unit in a series of intermittent steps, the ferrules remaining momentarily stationary at various points throughout the machine, means co-operating with said knot forming apparatus for intermittently transferring knots of bristles to said ferrules, means for inserting a wedge between sections of the bristles carried by the ferrules, means for driving the bristles further into the ferrules, means for trimming off the bristles abnormally projecting from the ferrules, means for moving the bristles further into the ferrules to a set position and means for finally combing the bristles, each of said operations being carried out while the ferrules and carried bristles are held momentarily stationary.

15. In a brush making machine, conveying apparatus for feeding bristles into said machine and means for preliminarily combing said bristles, means cooperating with the conveying apparatus for gripping the bristles at one end to project into the path of the comb and means for operating said comb.

16. In a brush making machine, a pair of endless chains for carrying bristles into the machine and means for preliminarily combing said bristles during feeding, a sprocket wheel rotatably mounted adjacent to said comb designed to carry one of said conveyor chains, an endless chain mounted above said sprocket wheel and means associated with said endless chain for clamping the bristles at one end between said chain and the conveyor chain passing over said sprocket.

17. In a brush machine, means for feeding bristles into said machine, means for separating said bristles into groups to form knots, including a bristle feeding finger and means to receive bristles, and means for automatically varying the feeding movement of the finger according to the amount of bristles fed thereby to insure the successive delivery of a substantially uniform quantity of bristles to said receiving means.

18. In a brush machine, means for feeding bristles into said machine, a control unit, means in connection with said control unit for separating said bristles into groups to form knots, including a bristle feeding finger, means in connection with the control unit for controlling the movement of said finger, and means in connection with said control unit for intermittently operating the bristle feeding means.

19. In a brush machine, conveying apparatus for feeding bristles into said machine, means for receiving said bristles from said conveying apparatus, a feeding finger, a knot forming unit, means for operating said feeding finger to pass groups of bristles from said receiving means to the knot forming unit, and means for controlling said feeding finger to feed groups of bristles to the knot forming unit in accordance with the capacity of said unit.

20. In a brush machine, conveying apparatus for feeding bristles into said machine, means for receiving bristles from said conveying apparatus, a control unit, a knot forming unit, a bristle feeding finger associated with said control unit to feed bristles from said receiving means to the knot forming unit, means for moving the finger forwardly in a direction towards the knot forming unit, means in connection with said control unit for automatically stopping the forward movement of said finger at various positions according to the amount of bristles delivered to said receiving means, means for returning said finger in a rearward direction, and means for raising and lowering the finger at the end and start respectively of its forward movement.

21. The device as claimed in claim 20, in which the means for moving the finger forwardly includes in a weight-operated lever connected to the finger.

22. The device as claimed in claim 20, in which the means for effecting the varied forward movement of the finger consists of a rack mounted on a lever for operating the finger, a spring pressed dog designed to engage with the teeth of said rack during operation, a lever for controlling the operation of said dog, and a cam for intermittently operating the dog operating lever.

23. In a brush machine, conveying apparatus for feeding bristles into said machine, means for receiving bristles from said conveying apparatus and means for feeding the bristles from said receiving means to knot forming apparatus, comprising a swingable beam, a feeding finger pivotally mounted on said beam, means for raising and lowering said beam to respectively remove said finger and engage said finger with the bristles carried by the receiving means, a control lever for moving said finger in one direction, a second control lever for moving the finger in the opposite direction, and means associated with the first control lever for stopping the movement of the finger in said one direction at various positions according to the volume of the bristles carried by said receiving means.

24. The device as claimed in claim 23, in which means is associated with said control levers for varying the movement of the conveyor apparatus in accordance with movement of said finger.

25. In a brush machine, conveying apparatus for feeding bristles into said machine, means for receiving bristles from said conveying apparatus and means for feeding the bristles from said receiving means to knot forming apparatus, comprising a swingable beam, a feeding finger pivotally mounted on said beam, means for raising and lowering said beam to respectively remove said finger and engage said finger with the bristles carried by the receiving means, a control lever for moving said finger in one direction, a second control lever for moving the finger in the opposite direction, means associated with the first control lever for stopping the movement of the finger in one direction according to the volume of bristles carried by said receiving means, a ratchet wheel in driving connection with a drive shaft for said conveying apparatus, and means associated with said control levers for operating said ratchet wheel to vary the movement of the conveying apparatus in accordance with the movement of said feeding finger.

26. The device as claimed in claim 23, in which the beam, one of the control levers and the means for varying the movement of the finger are operated from a main cam.

27. In a brush machine, conveying apparatus for feeding bristles into said machine, means for receiving bristles from said conveying apparatus and means for feeding bristles from said receiving means to a knot picking unit, comprising a swingable beam, a feeding finger pivotally mounted on said beam, means for raising and lowering said beam to respectively remove said finger and engage said finger with the bristles carried by the receiving means, a plurality of connected levers, means for swinging said levers in one direction, a connecting rod between one of said levers and said finger, means for automatically stopping the movement of said levers in one direction to stop the movement of said finger in various positions according to the volume of bristles carried by said receiving means, means for moving said levers in the opposite direction, and means in connection with one of said levers for controlling the operation of said bristle conveying apparatus in accordance with the movement of said finger.

28. The device as claimed in claim 27, in which means is provided in connection with one of said levers for varying the throw of the second lever.

29. In a brush making machine, means for conveying bristles into said machine, means for separating said bristles into knots, and means for passing ferrules through the machine, a reciprocating transfer unit, means in connection with said unit for engaging ferrules, means for operating said unit to move said ferrules through the machine in a series of steps, means for retaining said ferrules momentarily stationary at different points along said unit, means for introducing knots to ferrules at one of said points and means for retaining said ferrules against axial movement.

30. In a brush machine for uniting bristles and ferrules, means for passing ferrules through the machine, comprising a transfer unit including guide bars designed to receive ferrules therebetween, reciprocating mechanism adjacent said guide bars, means in connection with said reciprocating mechanism for engaging ferrules to move them between the guide bars, means in connection with said unit for maintaining said ferrules momentarily stationary during their travel for a bristle inserting operation, and means for operating the reciprocating mechanism to move said ferrules along said guide bars.

31. In a brush machine for uniting bristles and ferrules, means for passing ferrules through the machine, comprising a transfer unit including spaced apart guide bars designed to receive ferrules therebetween, a reciprocating transfer bar, means on said bar for engaging with the ferrules when said bar is travelling in one direction, means in connection with the transfer unit for retaining said ferrules momentarily stationary during their travel, for a bristle inserting operation, and means in connection with the transfer unit for retaining said ferrules against axial movement.

32. The device as claimed in claim 31, in which the transfer bar includes a plurality of spring pressed dogs designed to engage one side of the ferrules when moving in one direction and to pass beneath the ferrules when moving in the opposite direction.

33. The device as claimed in claim 31, in which the means for holding the ferrules against axial movement includes grooves in said guide bars designed to receive a projecting rib on the ferrules.

34. The device as claimed in claim 31, in which the means is provided for adjusting the transfer unit in a direction transverse to the direction of feed thereof and means for adjusting one of said guide bars in a vertical direction.

35. In a brush machine, means for conveying bristles into said machine, means for separating said bristles into knots, means for passing ferrules through the machine, means for introducing said knots to ferrules, a transfer unit including a pair of connected transfer bars arranged in parallel spaced relationship, means for reciprocating said bars, guide bars designed to receive ferrules therebetween co-operating with said transfer bars, a plurality of spaced apart spring pressed dogs on said transfer bars projecting in the path of said ferrules and designed to move them between the guide bars in one direction, means for retaining the ferrules against movement in the opposite direction, and means for preventing axial movement of said ferrules during movement in said transfer unit.

36. In a brush making machine, conveying apparatus for feeding brush units, composed of bristles carried by ferrules through the machine and means for inserting a wedge between the bristles of said brush units, comprising means for separating the bristles of brush units into sections, means for introducing one end of a strip of material between said sections, and means for cutting off the end of said strip lying between said sections.

37. The device as claimed in claim 36, in which means is provided for bracing the bristles while they are being separated into sections.

38. In a brush making machine, conveying apparatus for feeding brush units composed of bristles carried by ferrules and means for inserting wedges between the bristles, comprising a wedge inserting unit including means for ejecting one end of a strip of wedge forming material into the path of the bristles of each brush unit, means for separating the bristles of each unit into sections prior to contact with said wedge forming material, and means for shearing off the end of said material lying between the sections of said bristles.

39. The device as claimed in claim 38, in which the means for separating the bristles comprises a knife member mounted on said wedge forming unit to project into the path of the bristles of each brush unit.

40. In a brush making machine, conveying apparatus for feeding knots of bristles through said machine, a wedge inserting unit including means for intermittently ejecting a strip of wedge forming material into the path of the bristles of each knot, a bristle dividing knife mounted on said wedge inserting unit for dividing the travelling bristles into sections prior to the insertion of the strip between the sections, means in connection with said knife for engaging one side of the projecting wedge forming material, and means for shearing off so much of said material as lies between the sections of said bristles.

41. In a brush making machine, conveying apparatus for feeding knots of bristles through said machine, a wedge inserting unit including means for intermittently ejecting a strip of wedge forming material into the path of the bristles of each knot, a bristle dividing knife mounted on said wedge inserting unit for dividing the travelling bristles into sections prior to the insertion of the strip between the sections, means for bracing the bristles of each brush unit as they pass over said knife, and means for shearing off so much of said material as lies between the sections of said bristles.

42. The device as claimed in claim 41, in which the means for bracing the bristles comprises a comb having teeth designed to project through said bristles as they pass over said knife and means for intermittently operating said comb to project its teeth through said bristles.

43. In a brush making machine, conveying apparatus for feeding, units composed of ferrules carrying bristles through said machine, means for passing said units through said machine, means for separating the bristles into sections, means for inserting a wedge between said separated sections, means for forcefully moving said bristles and carried wedge further into said ferrules, and means for finally positioning said bristles and wedge within said ferrules.

44. The device as claimed in claim 43, in which the means for finally positioning the bristles within said ferrules comprises pulling mechanism including jaws designed to intermittently grip said bristles, and means for moving said jaws to pull said bristles and carried wedge firmly within said ferrules.

45. The device as claimed in claim 43, in which the means for finally positioning the bristles within the ferrules comprises a pair of jaws adapted to firmly grip said bristles, means for intermittently moving said jaws relatively in a vertical direction to grip said bristles, and means for intermittently moving said jaws in a horizontal direction to pull said bristles and carried wedge firmly within said ferrules.

46. In a brush making machine, conveying apparatus for feeding bristles and ferrules into said machine, means for separating said bristles into knots, means for introducing said knots to ferrules to form brush units, means for passing said brush units through said machine, means for separating the bristles into sections, means for inserting a wedge between said separated sections, means for forcefully moving said bristles and carried wedge further into said ferrules, means for finally positioning said bristles and wedge within said ferrules, and means for finally combing said bristles including combs mounted on said machine on opposite sides of the bristles projecting from said brush units and means for intermittently operating said combs to enter between said bristles and pass therethrough.

47. The device as claimed in claim 46, in which the combs are pivotally mounted and commonly operable upon a swinging lever and means is provided for intermittently reciprocating said lever and for reciprocating said combs.

48. A brush machine comprising means for receiving bristles fed to the machine, means for segregating the bristles into knots of uniform size, means for inserting said knots into ferrules, means for inserting a wedge between sections of said knots and means for moving said bristles and carried wedge partially through said ferrules to form a complete brush unit.

49. In a brush making machine, means for feeding a bunch of bristles into a position to enter a ferrule and co-operating means for contacting with one end of the bunch in a series of impacts to project said bristles into said ferrule.

50. In a brush making machine, means for feeding a bunch of bristles with one end exposed into a position to enter a ferrule and co-operating means for percussively contacting with said exposed end of said bunch to drive said bunch into said ferrule.

51. In a brush making machine, conveying apparatus for feeding units composed of ferrules carrying bristles through said machine, means for separating the bristles into sections, means for inserting a wedge between said separated sections, means for forcefully moving said bristles and carried wedge further into said ferrules, means for finally positioning said bristles and wedge within said ferrules, and means for finally combing said bristles including combs mounted on said machine on opposite sides of the bristles projecting from said brush units and means for intermittently operating said combs to enter between said bristles and pass therethrough.

LEWIS W. SIMMS.
ANDREW O. PATRIQUEN.